United States Patent
Wang et al.

(10) Patent No.: US 11,455,272 B2
(45) Date of Patent: Sep. 27, 2022

(54) ENERGY EFFICIENT MICROPROCESSOR WITH INDEX SELECTED HARDWARE ARCHITECTURE

(71) Applicant: Axis Semiconductor, Inc., Metheun, MA (US)

(72) Inventors: Xiaolin Wang, Metheun, MA (US); Qian Wu, Redwood City, CA (US)

(73) Assignee: Axis Semiconductor, Inc., Methuen, MA (US)

( * ) Notice: Subject to any disclaimer, the term of this patent is extended or adjusted under 35 U.S.C. 154(b) by 0 days.

(21) Appl. No.: 17/117,520

(22) Filed: Dec. 10, 2020

(65) Prior Publication Data
US 2022/0188264 A1 Jun. 16, 2022

(51) Int. Cl.
*G06F 15/78* (2006.01)
*G06F 8/41* (2018.01)

(52) U.S. Cl.
CPC .......... *G06F 15/7871* (2013.01); *G06F 8/443* (2013.01)

(58) Field of Classification Search
CPC .............. G06F 15/7867; G06F 15/7871
See application file for complete search history.

(56) References Cited

U.S. PATENT DOCUMENTS

| 5,818,254 A * | 10/1998 | Agrawal | H03K 19/17736 |
| | | | 326/39 |
| 2018/0081834 A1* | 3/2018 | Wang | G06F 13/4022 |
| 2018/0267809 A1* | 9/2018 | Li | G06F 9/30098 |
| 2019/0138493 A1* | 5/2019 | Teh | G06F 13/4004 |

\* cited by examiner

*Primary Examiner* — Courtney P Carmichael-Moody
(74) *Attorney, Agent, or Firm* — Maine Cernota & Rardin

(57) ABSTRACT

An SoC maintains the full flexibility of a general-purpose microprocessor while providing energy efficiency similar to an ASIC by implementing software-controlled virtual hardware architectures that enable the SoC to function as a virtual ASIC. The SoC comprises a plurality of "Stella" Reconfigurable Multiprocessors (SRMs) supported by a Network-on-a-Chip that provides efficient data transfer during program execution. A hierarchy of programmable switches interconnects the programmable elements of each of the SRMs at different levels to form their virtual architectures. Arithmetic, data flow, and interconnect operations are also rendered programmable. An architecture index" points to a storage location where pre-determined hardware architectures are stored and extracted during program execution. The programmed architectures are able to mimic ASIC properties such as variable computation types, bit-resolutions, data flows, and amount and proportions of compute and data flow operations and sizes. Once established, each architecture remains in place as long as needed.

15 Claims, 21 Drawing Sheets

ENERGY EFFICIENT MICROPROCESSOR WITH INDEX SELECTED HARDWARE ARCHITECTURE

FIELD OF THE INVENTION

The invention relates to computing devices, and more particularly, to designs of general-purpose microprocessors and to methods of compiling programs to take maximum advantage of specific microprocessor designs.

BACKGROUND OF THE INVENTION

In 1965 Gordon Moore of Fairchild Semiconductor predicted that the number of transistors in a dense integrated circuit (IC) would double about every two years. This prediction has come to be known as "Moore's Law," and although it is only a prediction, and not a law, nevertheless the number of transistors included in general purpose microprocessors, such as those made by Intel, AMD, ARM and others, has tended to follow Moore's law from 1965 and continuing to the present time. However, with reference to FIG. 1, in recent years the clocking frequencies of general-purpose microprocessors has failed to keep pace with the growth in the number of transistors. As a result, the performance growth of general-purpose microprocessors has been significantly retarded.

The slowing of the growth in clocking speeds is mainly due to power limitations. In fact, it can be predicted that in the near future there will be "dark silicon" in very high density, general purpose microprocessors. Accordingly, the performance growth of general-purpose microprocessors is becoming increasingly retarded by power limitations, and not by the total number of transistors included on the chip. Therefore, there is a need to find new ways to improve the energy efficiency of general-purpose microprocessors, i.e. ways to improve computation performance of a general-purpose microprocessor without increasing its power requirements.

In this regard, it is interesting to note that there is a huge gap between the power efficiency, as measured in millions of operations per second per milliwatt (MOPS/mW) between CPUs and other general-purpose microprocessors and dedicated "application specific integrated circuits (ASICs). Generally speaking, with reference to FIG. 2, the power efficiency of an ASIC tends to increase as the ASIC becomes more dedicated to a specific application. Conversely, the more general purpose (i.e. configurable or programmable) an IC is, the less power efficient it tends to be for certain specific application.

In general, the energy consumption of a dense, large scale integrated circuit tends to be determined mainly by the scale of its fabrication and the type of operations that are performed. For example, FIG. 3 illustrates the energy consumption required by an IC fabricated at a 45 nm scale to perform certain operations. These energy numbers are reduced proportionally for otherwise similar ICs that are fabricated at scales of 28 nm, 20 nm, 16 nm, 7 nm, and at deep submicron fabrication scales. Another factor that influences energy consumption is the energy that is required to transfer data over wires, which increases as the lengths of the wires increase. Accordingly, one approach to limiting energy consumption is to ensure that most data transfers are made "locally," i.e. over very short physical distances.

One reason for the lower power requirements of ASICs is that they tend to require a lower data transfer energy, because only those data transfers are performed that are required to meet the specific needs of the ASIC, and because an ASIC will generally transfer data directly between modules whenever possible, and will only resort to transferring data via shared memory as a last resort. This serves to maximize relatively low energy local computations while minimizing relatively higher energy memory accesses.

Another reason for the lower power requirements of ASICs as compared to general-purpose microprocessors is that they generally implement compute data paths having optimal widths for the specific application of the ASIC. For example, for a given operation an ASIC might implement a data path having an optimal 4-bit width, while a general-purpose microprocessor might be required to perform the same operation using a data path having a 16-bit width, thereby requiring more energy. Accordingly, ASICs are able to adapt to the computation and data transfer requirements of a specific application so as to reduce the hardware resource requirements and associated power consumption.

In addition, the energy consumption of an IC will generally depend on the energy required for each operation multiplied by the rate at which operations are performed, i.e. the clock speed. Yet another reason why ASICs require less power than general-purpose microprocessors is that they can provide the same performance while operating at lower clock speeds.

In general, therefore, ASICs are able to perform their specified applications with lower power consumption than a comparable general-purpose microprocessor because each ASIC is designed with specific architecture features that are optimized to efficiently meet the requirements of the specific application to which the ASIC is directed. These include:
- Computation type such as fixed point or floating point, addition, subtraction, multiplication, division, shifts, and rotation;
- Computation data path width: 32-bit, 16-bit, 8-bit, 4-bit or binary;
- Data flow type: direct flow over wires, direct flow over pipeline registers, data flow with buffering memory
- Amount and proportion of computation and data flow elements; and
- Size of specific hardware blocks serving algorithm modules.

In addition, ASICs are able to operate different hardware blocks at different clock frequencies according to the specified application. For example, in video processing the frame rate, block rate, and pixel rate are all different. For HD video at 30 frames per second, a new frame is received every 1/30 second, while a new block is received 1/30/720/1080*8*8 second, and a new pixel is received every 1/30/720/1080 second. Accordingly, in an ASIC directed to HD video processing, hardware blocks that decode the frame header can operate more slowly than hardware blocks that performing iDCT on blocks, while hardware blocks that perform pixel-level processing must operate at even higher speeds. According to this approach, the block control and data paths will only change at necessary intervals, thereby reducing overall power consumption.

Accordingly, for ICs having nominally the same number of transistors, there would appear to be a trade-off between the flexibility and programmability of the IC and its power efficiency.

What is needed, therefore, is a microprocessor design and method of use thereof that maintains the full flexibility of a general-purpose microprocessor while at the same time providing an energy efficiency that is similar to an ASIC.

SUMMARY OF THE INVENTION

The present invention is a System on a Chip (SoC) and method of use thereof that maintains the full flexibility of a general-purpose microprocessor while at the same time providing an energy efficiency that is similar to an ASIC. The disclosed SoC, which is a "System to EmuLate Large ASICS," and is referred to herein as the "Stella" SoC, implements software-controlled optimization of the hardware "architecture" or "structure" of the microprocessor, thereby creating a virtual hardware architecture that enables the Stella SoC to function as a virtual ASIC. These structures are referred to as "virtual," because unlike a traditional ASIC, the Stella SoC can be transitioned under software control between different virtual architectures as needed, both before and during program execution, such that the full programming flexibility of a general-purpose CPU or other general purpose SoC is maintained while near-ASIC performance is achieved.

This ability to provide software configured virtual architectures is implemented in Stella by using a hierarchy of programmable switches to interconnect programmable compute blocks and storage blocks, also referred to herein collectively as programmable elements or PEs, at different levels to form the "structures" that define the virtual architectures. By thus rendering the arithmetic, data flow and interconnect operations programmable, the overall hardware platform architecture is rendered programmable. The result is a software-controlled hardware architecture.

The Stella SoC further implements an architecture "index" pointing to a storage location in which pre-determined hardware architectures, i.e. predetermined settings for the hierarchical switches, are stored, and from which the hierarchical switch settings are extracted as needed before and/or during program execution. The result is an "index-specified architecture" (ISA) that provides near-ASIC power efficiency while providing full programming flexibility. In particular, the programmed structures that are stored in the index are able to mimic ASIC properties such as variable computation types, bit-resolutions, data flows, and amount and proportions of compute and data flow operations and sizes.

For example, a given structure might represent a 2D pipeline, where the first dimension is the number of stages of each pipeline, and the second dimension is the number of parallel pipelines, with possible data flow between provided between various of the parallel pipelines. This approach can increase the relative number of local computes, thereby reducing the data transfer energy in a manner that emulates the data transfer energy efficiency of ASICs.

This process of creating structures via the Stella ISA can be compared with the creation of high-level instructions from low level operations for a "complex instruction set computer" (CISC). The purpose of creating high level CISC instructions is to bridge the semantics gap between high-level programming and the hardware instruction set.

As noted above, one of the power efficiency problems of conventional, general-purpose microprocessors is the huge control and data transfer overhead that results from massive parallel processing. In other words, during parallel-thread execution of a program, too much power is required in a conventional microprocessor to feed both instructions and data to the processing engine cycle after cycle. In contrast, the ISA design in embodiments of the Stella SoC allows each structure to remain in place for as long as needed, based on a single fetch and decode. The number of cycles during which a given structure remains unchanged is referred to herein as the structure's "lifetime."

In various embodiments, the index is able to pass instructions through a control network (CN) to indirectly control PEs, thereby allowing a single instruction sequencer to control many different PEs. Each connection of a single sequencer with a plurality of PEs forms a "dynamic core" (DC), thereby allowing specification of the clock rate of the sequencer to match the algorithmic module's desired rate of operation.

The programmability of the disclosed Stella SoC can be considered to extend in both time and space. Specifically, the sequencing of the successive structures represents programming of the microprocessor as a function of time, while the enablement of multiple DCs by the Stella hardware resources provides programming of the microprocessor in space. The sizes of the DCs can be dynamically specified and configured to best fit the algorithmic requirements that are imposed upon them.

The stella SoC architecture is able to overcomes the "Von Neumann bottleneck" by transferring far fewer instructions and far less data from storage to the processing engine, as compared to traditional microprocessors, without sacrificing massive parallel processing efficiency. In embodiments, this is accomplished by implementing features such as:

An instruction set design that increases the amount of parallel operations that can be coded in a fixed-width instruction;

An instruction set design that avoids unnecessary instruction fetches and decodes, thereby ensuring that a large proportion of the consumed energy is directed to computations rather than to program control steps;

Implementation of a "Network on a Chip" (NoC); and

A compiler design that takes full advantage of the special features of the Stella SoC, including a high degree of data reuse and improved data transfer efficiency over time and space.

A first general aspect of the present invention is a system on a chip (SoC), referred to herein as the Stella SoC, that includes a plurality of programmable elements (PEs), an index, at least one sequencer, and at least one switch, the index being configured to point to a storage location that stores a plurality of structure configuration instructions defining structures that can be successively implemented during program execution under program control, each of said structures, when implemented, causing the at least one switch to create an Index Specified Architecture (ISA) by forming connections between the PEs to create dynamic cores (DCs) having specified configurations, said ISA further defining mechanisms by which data is transferred between the PEs during program execution.

In embodiments, at least one of the PEs is a compute block, at least one of the PEs is a storage block, and at least one of the PEs is a switch block.

In any of the above embodiments, each of the DCs can comprise one of the sequencers interconnected by the at least one switch with at least one of the PEs.

In any of the above embodiments, the at least one switch can comprise a Hierarchical Programmable Switch (HPS) and a transport switch (TS). In some of these embodiments the TS comprises centralized memory. In any of these embodiments, the HPS can be configured as a hierarchical plurality of layers, each of the layers comprising at least one leaf element, each of said leaf elements comprising a plurality of the DCs interconnected with each other by a switch node of the HPS, the leaf elements in each layer except an uppermost of the layers comprising a plurality of leaf elements groups, wherein all of the leaf element groups in the layer are interconnected with each other by a parent switch node of the HPS to form a single leaf element of a next-higher of the levels.

In any of the above embodiments, each of the connections formed by the at least one switch can able to be separately configured, under software control during program execution, to be either a circuit mode connection or a packet mode connection.

Any of the above embodiments can further include a control network (CN) configured to transfer the structure configuration instructions index from the sequencers to the PEs during program execution. In some of these embodiments the CN is further configured to transfer the status for next structure configuration instruction from the PEs to the sequencers during program execution.

In any of the above embodiments, the SoC can be able to cause different ones of the DCs to execute software instructions at different control frequencies.

A second general aspect of the present invention is a method of preparing software code that can be executed by the SoC of claim 1. The method includes accepting source code that defines operations to be carried out by the SoC, said source code comprising a plurality of software modules, calculating amounts of data transfer and data transfer bandwidths between the software modules that will be required during execution of the software code, assigning the software modules to selected PEs for execution thereupon, wherein groups of the software modules that will require a high data transfer bandwidth therebetween are assigned to physically proximate PEs, and preparing structure configuration instructions that can be stored in the index and retrieved during program execution to implement structures, each of said structures, when implemented, causing at least one switch to create dynamic cores (DCs) by interconnecting specified groups of the PEs and forming control networks that interconnect the sequencers with the PEs.

Embodiments further include characterizing each of the software modules as having either a constant processing time or a variable processing time, forming at least one constant time module group, each of the constant time module groups including only software modules that have constant processing times that are the same as, or similar to, each other, for each of the constant time module groups, equalizing the constant processing times of the software modules in the constant time module group by adding null operations thereto as needed to cause the processing times of all of the software modules in the constant time module group to be equal to each other, and for each of the constant time module groups, assigning all of the software modules that are included in the constant time module group to the same dynamic core.

Any of the above embodiments can further include causing the at least one switch to create a data network that forms connections between data paths of the PEs, a status network that forms connections between the PEs or between the sequencers, and a control network that forms connections between the sequencers and the PEs.

Any of the above embodiments can further include, for each of the dynamic cores, causing data transfers within the dynamic core to be made via at least one register of the dynamic core whenever possible, for each of the dynamic cores, causing data transfers within the dynamic core to be made via distributed memory in a tightly coupled mode if the data transfer cannot be made via the one or more registers of the dynamic core, causing data transfers to be made between the dynamic cores via distributed memory in a loosely coupled mode, and causing data transfers to be made between the dynamic cores and external peripherals via centralized memory in a loosely coupled mode.

Any of the above embodiments can further include causing the software modules that are being executed on different ones of the dynamic cores to be executed at different control frequencies.

A third general aspect of the present invention is a system on a chip (SoC), referred to herein as the Stella SoC, that includes a plurality of programmable elements (PEs), said plurality of PEs comprising at least one compute block, at least one switch block and, at least one storage block, at least one sequencer, a network on a chip (NoC), the NoC being configured to create a plurality of Dynamic Cores (DCs) by interconnecting selected groups of one or more of the PEs with selected ones of the sequencers, each of the DCs thereby comprising one of the sequencers interconnected by the a Control Network (CN) of the NoC with at least one of the PEs, and an index, the NoC comprising a Hierarchical Programmable Switch (HPS) and a transport switch (TS), the TS comprising centralized memory, the HPS being configured to form a hierarchical plurality of layers, each of the layers comprising at least one leaf element, each of said leaf elements comprising a plurality of the DCs interconnected with each other by a switch node of the HPS, the leaf elements in each layer except an uppermost of the layers comprising a plurality of leaf elements groups, wherein all of the leaf element groups in the layer are interconnected with each other by a parent switch node of the HPS to form a single leaf element of a next-higher of the levels, the index being configured to store a plurality of structure configurations that can be successively implemented during program execution, each of said structure configurations, when implemented, causing the NoC to create an Index Specified Architecture (ISA) by causing the NoC to generate a specified number of DCs having specified configurations, said ISA further comprising defined mechanisms by which data is transferred between the PEs during program execution.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a System on a Chip (SoC) and method of use thereof that maintains the full flexibility of a general-purpose microprocessor while at the same time providing an energy efficiency that is similar to an ASIC. The disclosed SoC, referred to herein as the "Stella" SoC, implements a feature referred to herein as "index selected architectures" (ISA), whereby the "architecture" or "structure" of the microprocessor is controlled and optimized during program execution under software control, thereby causing the Stella SoC to function as a virtual ASIC. Unlike a traditional ASIC, however, the Stella SoC can be transitioned between different virtual ASIC architectures as needed under software control, such that the full programming flexibility of a general-purpose CPU or other SoC is maintained.

Figure 4:
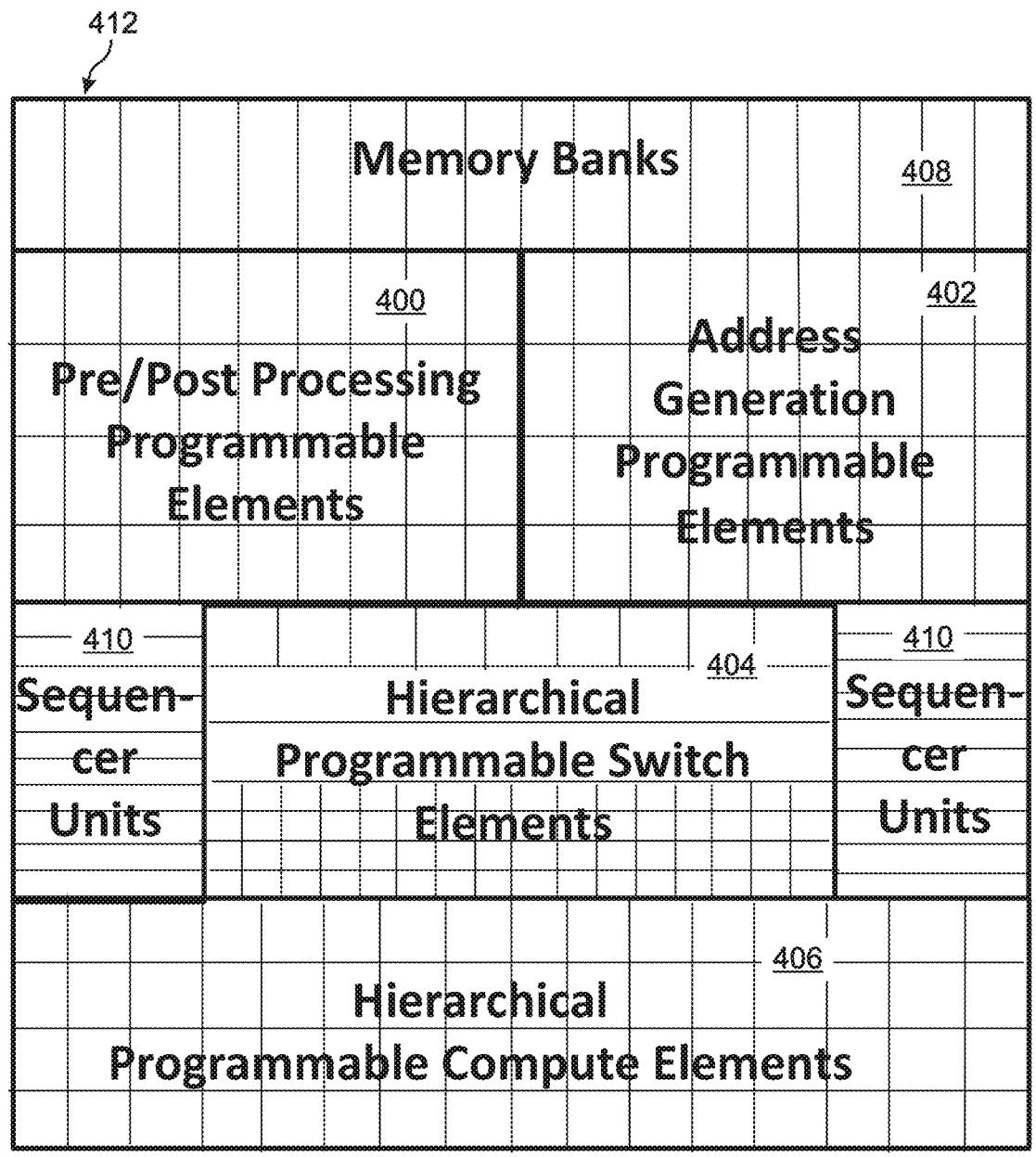
FIG. 4 illustrates the basic design element of the SoC of the present invention.

With reference to FIG. 4, the Stella SoC is organized as a plurality of Stella Reconfigurable Multiprocessors (SRMs) 412 supported by a Network-on-a-Chip (NoC). The NoC is scalable according to the embodiment to support any number of SRMs 412. Each of the SRMs 412 comprises a plurality of PEs of different types that perform different sets of operations. These can be grouped into pre or post processing PEs 400, addressing PEs 402, switch PEs 404 and compute PEs 406, together with memory banks 408 and sequencer units 410. The organization of the PEs in an SRM 412, as illustrated in FIG. 4, follows the natural data path of any data processing units as following:

Generate read address
Data read from memory banks
Preprocess data
Transfer data to compute module(s)
Perform computation on incoming data to produce results
Transfer results to postprocessing module(s)
Postprocess results
Generate write address
Write results to memory banks Because all of the elements 400-410 of the Stella SoC are programmable, the Stella SoC can be adapted to perform many different algorithms by using the switches to connect different numbers of PEs together to form structures. The resulting structures are then organized in sequences (time) and/or in space (parallel).

Figure 5:
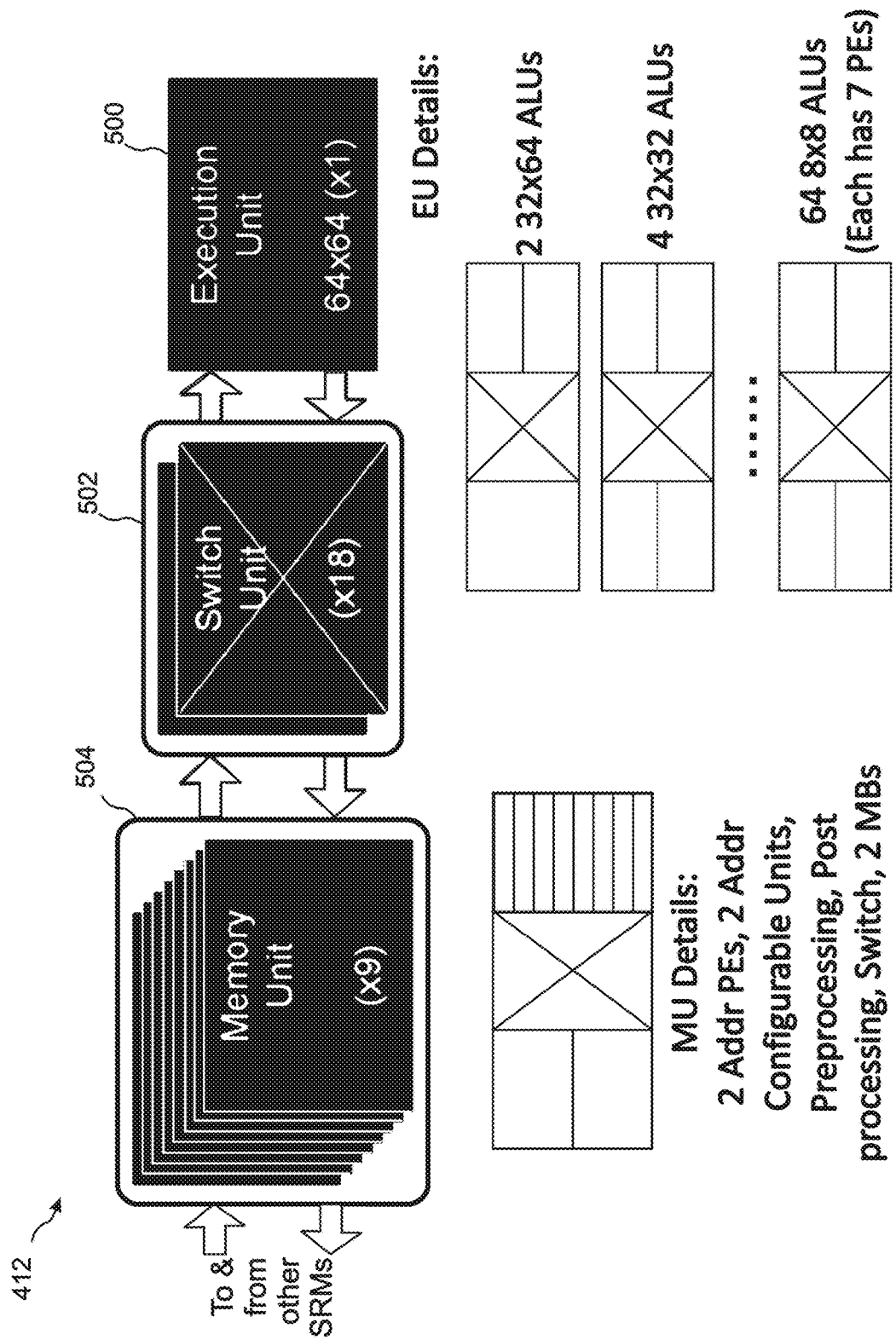
FIG. 5 presents a hierarchical view of a single SRM as implemented in an exemplary embodiment of the present invention.

FIG. 5 presents a hierarchical view of a single SRM 412 as implemented in the exemplary embodiment. As can be seen in FIG. 5, each SRM 412 in the exemplary embodiment comprises an Execution Unit 500 of 64×64 ALUs, 18 Switch Units 502 in two directions, and 9 Memory Units 504 each with 2 Memory Banks.

Each Execution Unit 500 is organized as one of the following:

2 32×64 ALU
4 32×32 ALU
8 16×32 ALU
16 16×16 ALU
32 8×16 ALU
64 8×16 ALU
A combination of above subject to hardware resource constraints In turn, each ALU comprises 6 PEs. Each ALU also contains one configurable instruction fetch (IF) element for low latency if/else usage.

Each Memory Unit includes 4 PEs, which are:
Read addressing
Read preprocessing
Write addressing
Write postprocessing Each Memory Unit also contains two configurable IF elements and two configurable addressing elements for sending and receiving data in communication with other SRMs 412.

Figure 6:
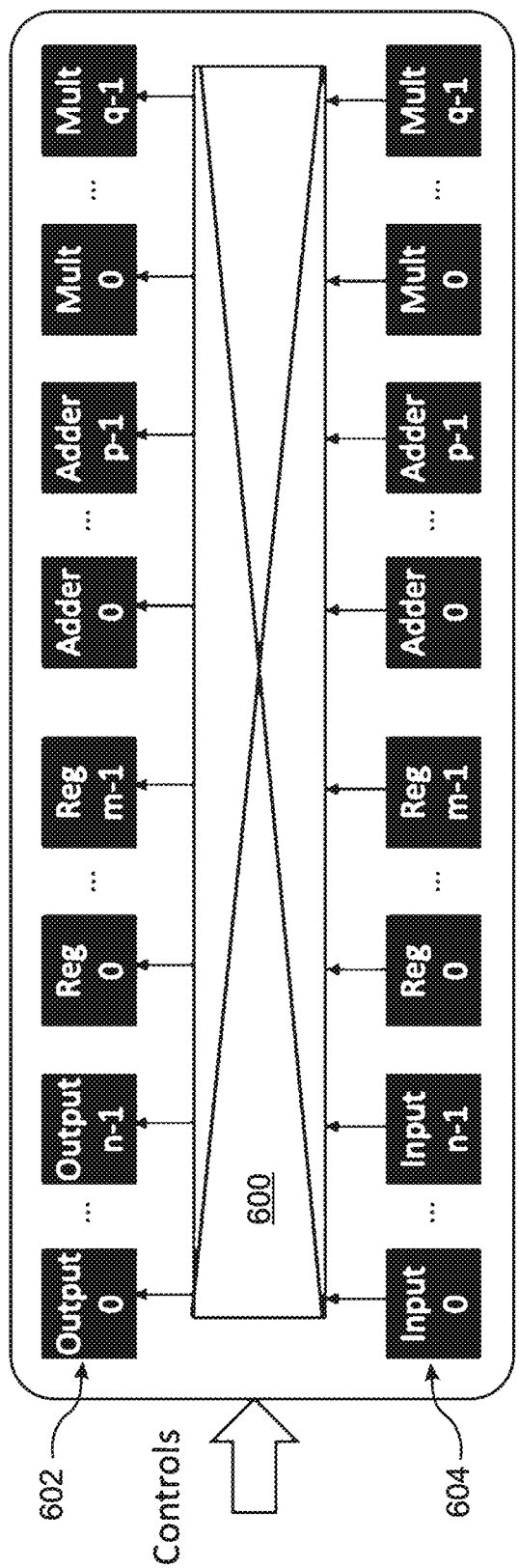
FIG. 6 illustrates the approach to implementing programmable structures that is implemented in embodiments of the present invention.

With reference to FIG. 6, a Stella "structure," as the term is used herein, refers to a particular set of connections, formed by a programmable switch 600, of PE inputs and operator outputs 604 with operator inputs and PE outputs 602. In FIG. 6, the PE inputs and operator inputs are indicated as being above the switch 600, while the PE outputs and operator outputs are indicated as being below the switch 600. Once the switch connections and operations that define a structure have been set by an instruction, they will remain unchanged until the lifetime of that instruction has ended and a new instruction has been fetched and decoded. As a result, the lifetime of a structure can be only one cycle, or it can extend over many cycles. Extending a structure lifetime over many cycles improves energy efficiency by decreasing the rate at which control energy is expended.

During a period of time, as instructions are fetched and decoded in sequence, the interconnections between the hardware resources are successively reconfigured to create a sequence of structures, having varying lifetimes. Examples of structures that can be formed by the interconnections of the programmable switch 600 include:

1D data pipeline;
2D independent data pipeline;
2D data pipeline with data exchanges;
1D data dependent control pipeline; and
2D data dependent control pipeline;
as well as many other types of pipelines that may be required to fit the specific computation, data transfer and data dependent control requirements of a specific algorithmic module.

Figure 7:
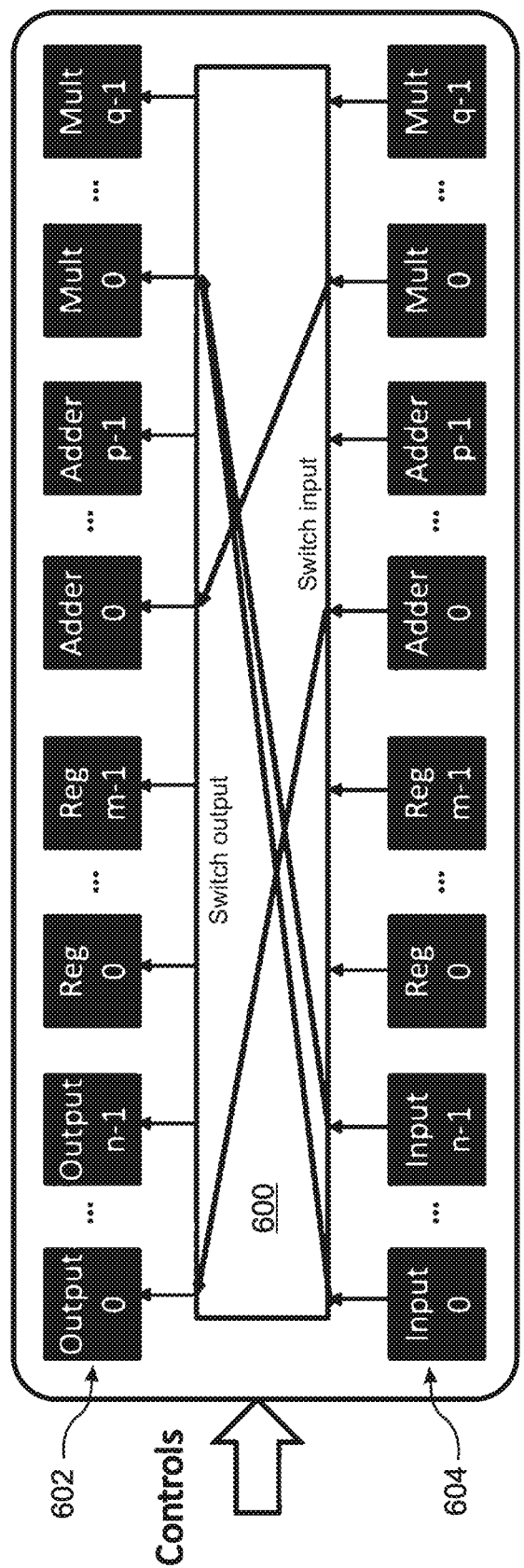
FIG. 7 illustrates the approach of FIG. 6 applied to form a pipelined multiply and accumulate (MAC) operation having 2 inputs and 1 output.

As an example, FIG. 7 illustrates a structure for a pipelined multiply and accumulate (MAC) operation having 2 inputs and 1 output. Once the structure is established by a single instruction fetch an decode, the structure is able to accept 1 pair of inputs and produce 1 output during every cycle.

Figure 8:
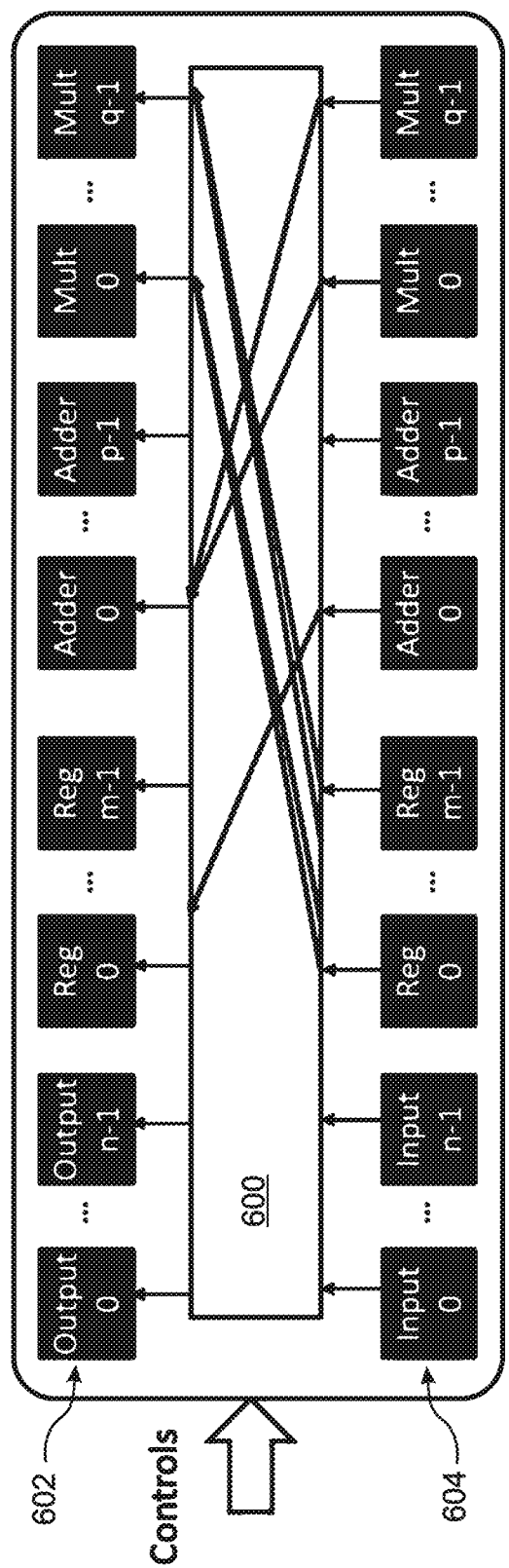
FIG. 8 illustrates the approach of FIG. 6 applied to form a data pipeline.

As another example, FIG. 8 illustrates establishing a structure for a data pipeline. The first two stages of the pipeline accept two sets of data and represent a data pipeline similar to a single instruction multiple data (SIMD) 2D data pipeline. The last two stages of the pipeline accept one set of data and represent a 1D data pipeline. This structure also includes data exchange in the third stage of the pipeline:

Reg 0,1→Mult0→Adder 0→Reg 2
Reg m-2, m-1→Mult q-1→Adder 0→Reg 2

So long as sufficient hardware resources are available, a structure can be established by a single instruction fetch and decode that can accept many sets of input data over many cycles, thereby significantly increasing the data throughput and reducing the control power overhead. The structure can be configured to have programmable interconnection between different data from different pipeline.

Figure 9:
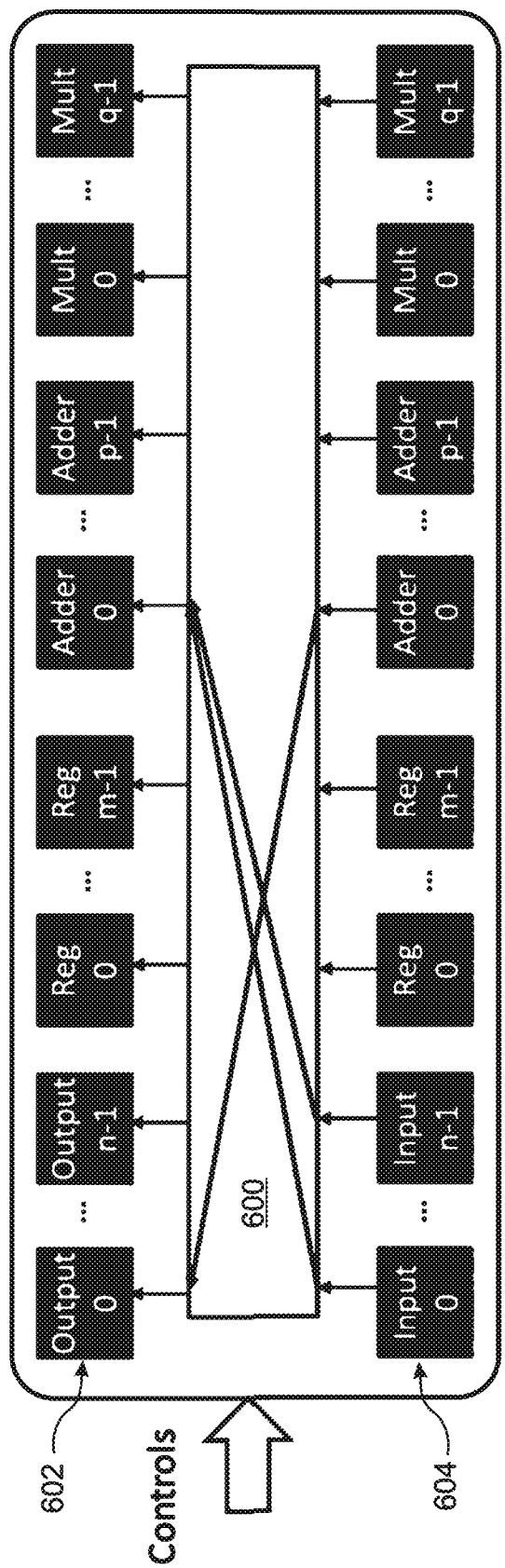
FIG. 9 illustrates the approach of FIG. 6 applied to form a data-dependent control pipeline.

As yet another example, FIG. 9 illustrates a structure that serves as a data-dependent control pipeline. The illustrated structure of:

input0 & input n-1→Adder→Output 0 performs output[0]=if (input[n-1]>input[0]). When the overflow flag of adder is connected to output[0], output[0] will be controlled by a branch instruction to progress further down the pipeline. Thus, the data dependent portion of the control pipeline has a very short delay time due to the short length of the pipeline. The delay time can be even further reduced by using the configurable IF elements instead of a branch statement. The illustrated data dependent control pipeline can accept a new set of inputs every cycle during the lifetime of the instruction.

By programming in the spatial dimension, structures can be connected together using hierarchical switches to form general pipelines of any length, shape and size, thereby adapting to the operation needs of an algorithmic module.

In traditional microprocessors, the number of data lanes in a very long instruction word (VLIW) or superscalar architecture is limited by the instruction width. The wider the instruction, the more data lanes and operations can be specified. However, wider instructions require more energy to fetch and decode.

Stella SRMs 412 solve this problem by separating each instruction into two parts:

A sequencing part that defines the flow of the instruction, such as step, branch, jump, etc.
A control vector index of fixed width that is used as an index to read the operations control storage, which can have a variable width and can reside next to the data path.

This unique instruction design allows the instructions themselves to remain fixed in width, for example at 16 bits, whereby each of these fixed width instructions points to a variable width instruction word stored in the operations control storage, thereby providing an ability to specify the controls for only a few data lanes or for many data lanes, depending on the algorithmic requirements. The energy required to fetch the 16-bit instructions is small, and the energy required to fetch the variable bits of the control vectors is also small, because each control vector is close to the data path that it controls.

Furthermore, the sequencers and the Programmable Elements are interconnected by the Control Network (CN), which can be configured to pass the control vector index from sequencer to the PEs, and the status from the PEs to the sequencer.

Figure 10:
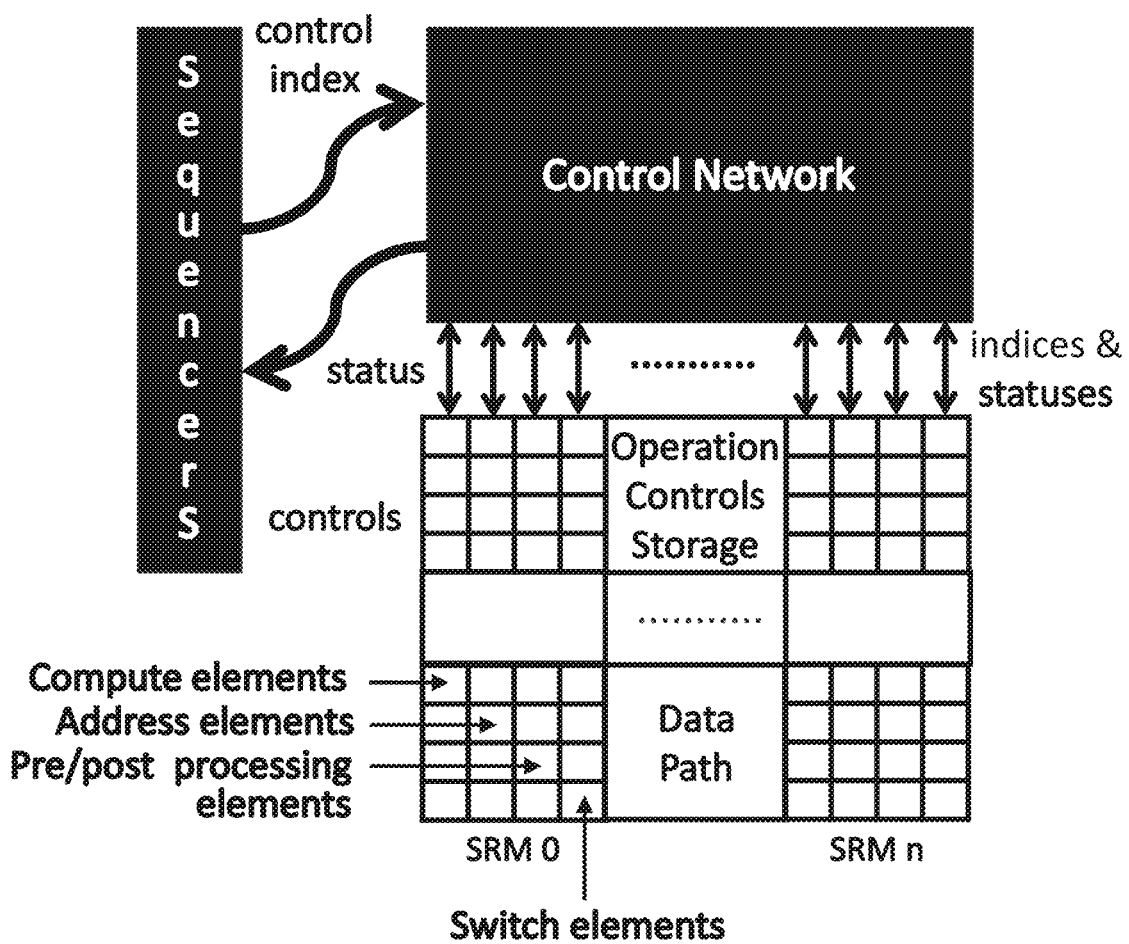
FIG. 10 illustrates decoupling by the control network of the operations of the control sequencers and programmable elements in an embodiment of the present invention.

As the term is used herein, a "Dynamic Core" (DC) is a set of Programmable Elements (PEs) controlled by a single sequencer via the Control Network (CN). The Control Network decouples the operations of the control sequencers and Programmable Elements, as illustrated in FIG. 10.

A Dynamic Core may have its PE or PEs coming from any single SRM 412 or multiple SRMs 412. In embodiments all of the SoC's resources can be controlled by single sequencer to form a large DC. In various embodiments, a single preprocessing PE can be controlled by a sequencer to form a tiny DC.

The PE or PEs in the DCs are selected to maximally match each specific algorithmic module's requirements of operations type, data path width, amount and proportion of computation and data flow elements and size. As a specific example, for a 50-layer deep neural residual network (DNN RESNET-50), the PEs in the first two dynamic cores, i.e. DC0 and DC1, can be programmed to have the same throughput, and to match the requirements of the first and second convolution layers. The PEs in DC1 will be of about half the size of the PEs in DC0 if, for example, the 1st convolution layer has 118 million MACs while the second convolution layer has 51 million MACs.

This ability to change the sizes of the DCs also alleviates the load balancing problems that typically arise in traditional multi-core processors. For such processors, so as to maximize efficiency, all of the algorithmic functions need to be partitioned with equal, or at least similar, loads to be mapped onto different cores with same size and functionality.

Figure 11:
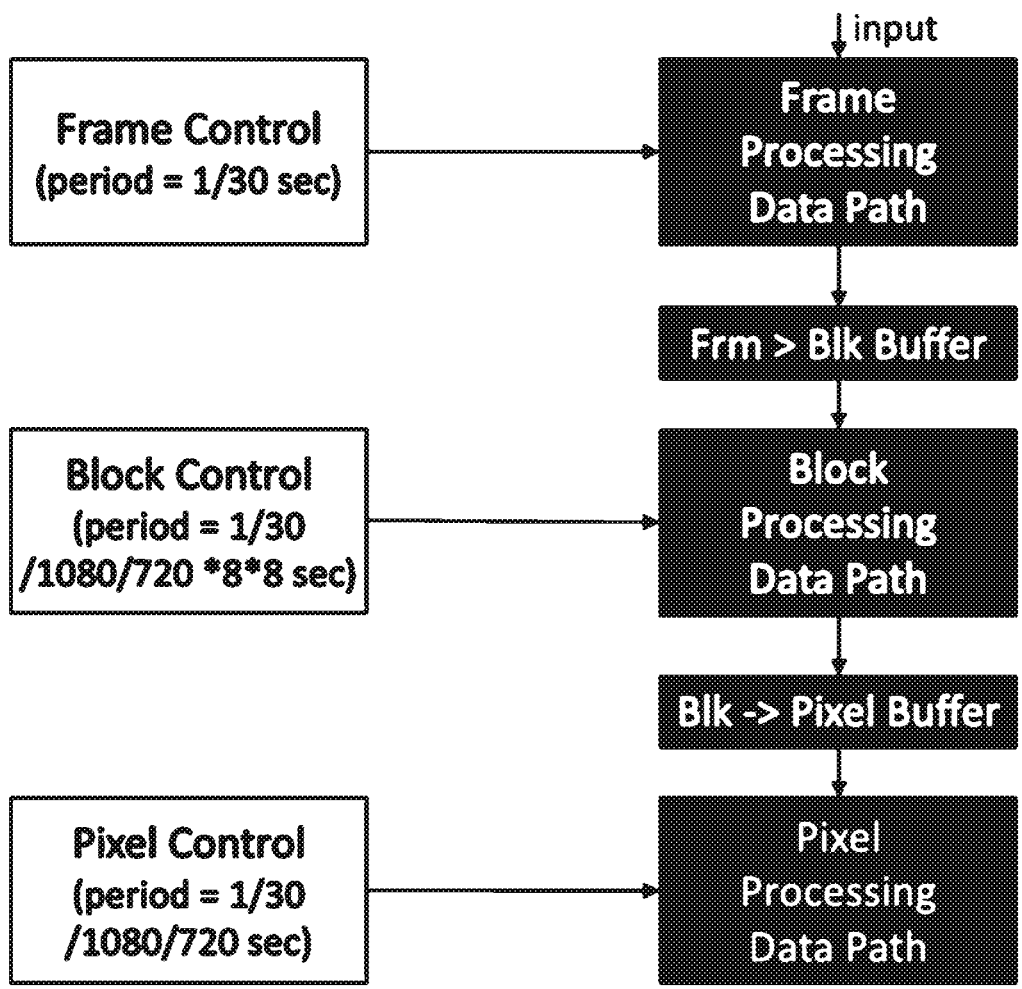
FIG. 11 illustrates a high-level block diagram for an ASIC that is designed to implement the video processing algorithm according to the prior art.
Figure 12:
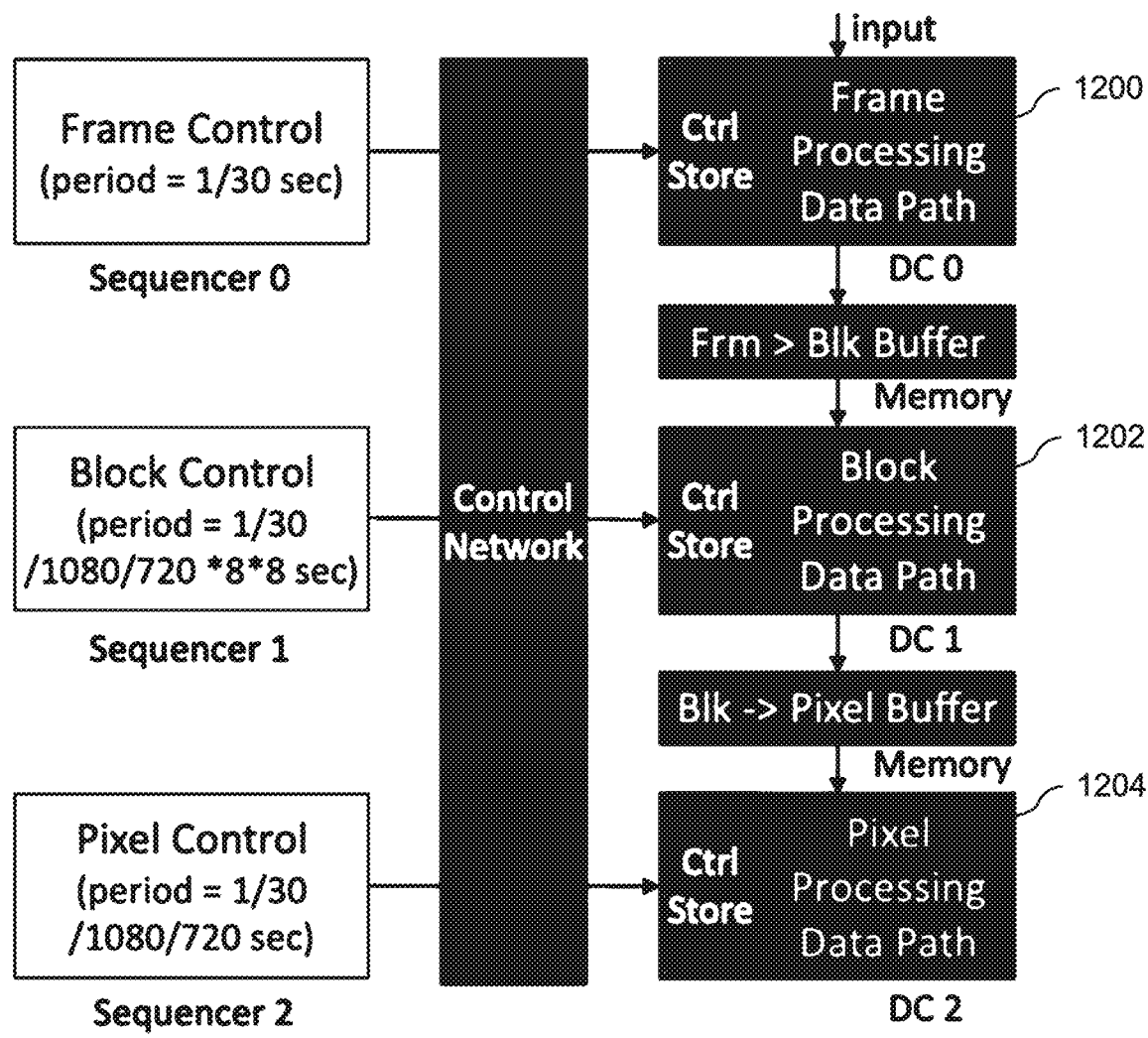
FIG. 12 illustrates a structure implemented in an embodiment of the present invention that is logically similar to the structure of FIG. 11.

The sequencers for different DCs can be programmed with sequences of structures, each a different lifetime, to match the specific control frequency requirements of different arithmetic modules. For example, a high-level block diagram for an ASIC that is designed to implement the video processing algorithm described above is shown in FIG. 11. The same algorithm can be implemented on a Stella SoC, by implementing a logically similar structure, as shown in FIG. 12. Here DC0 1200, DC1 1202 and DC2 12-4 have different control sequences. The structure in DC0 1200 has a lifetime of 1/30 second. The structure in DC1 1202 has a lifetime of 1/30/720/1080*8*8 second. The structure in DC2 1204 has a lifetime of 1/30/720/1080 seconds. By tailoring the individual control frequencies to meet the separate requirements of each of the dynamic cores, the number of instruction fetches and decodes per unit time is reduced, thereby providing a "temporal" power saving in addition to the spatial power saving described above to significantly reduce the control power overhead.

Figure 13:
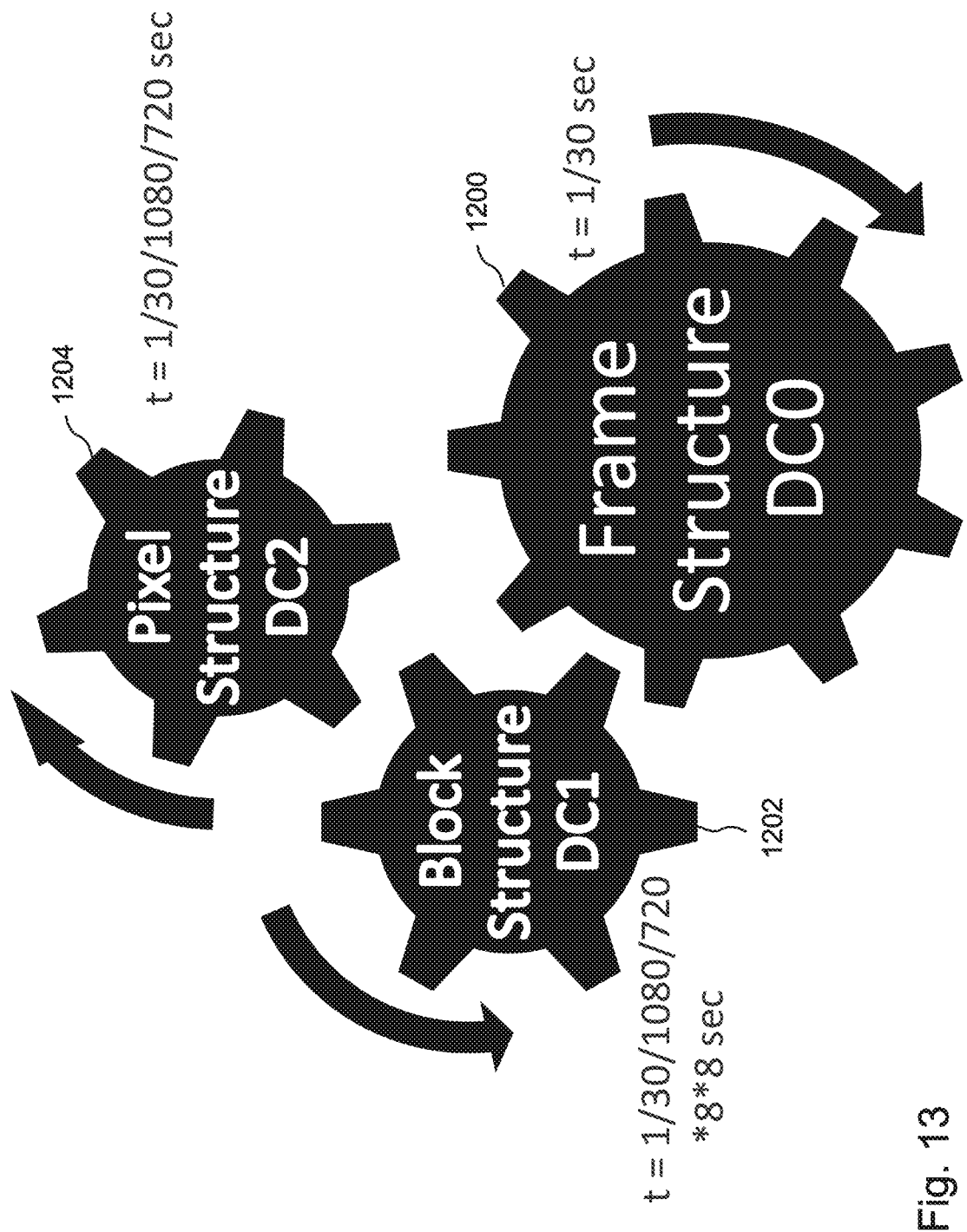
FIG. 13 illustrates a synchronous relationship between three dynamic cores by way of an analogy of gears having different numbers of teeth, and thereby turning at different rates while remaining synchronized.

FIG. 13 illustrates this synchronous relationship between DC0 1200, DC1 1202 and DC2 1204 by way of an analogy of gears having different numbers of teeth, and thereby turning at different rates while remaining synchronized together. The turning frequency of the DC2 gear 1204 is faster than the DC1 gear 1202, which in turn is faster than the DC0 gear 1200. These differences are indicated by "t="

markings on the gears 1200, 1202, 1204. The "gears" 1200, 1202, 1204 are connected together such that the trigger each other in the same manner that a new frame triggers new blocks, which in turn trigger new pixels in the ASIC design of FIG. 11. Both the ASIC blocks of FIG. 11 and the Stella blocks of FIG. 12 are connected by data flow.

Therefore, in contrast with traditional processors, where the overall clocking rate is the same for all modules, by separately controlling and setting the structure lifetimes, the Stella SoC enables the clocking rate of each software module to be adapted to the specific control frequency requirements of that software module, in a similar manner to the approach that is implemented in an ASICs.

The key to improving the performance of very high density general purpose CPU's and other SoCs, in the face of power limitations and consequent clock rate limitations, is parallel processing. The challenge then becomes:

1. How to increase the number of operations per cycle that can be implemented by a single instruction; and
2. How to provide the required data to those operations.

Current solutions sacrifice POWER efficiency and/or performance to achieve high versatility in general purpose processors. This approach requires loading a program with 10's of thousands of lines of code from a disk written in hundreds of lines of instruction sets and executing the code for billions of cycles, wherein new instructions are fetched during each cycle. Current processors focus on solving two problems:

how to issue more instructions per cycle; and
how to keep the layers of cache memory fed with useful data or instructions.

Solving each of these problems requires a large amount of silicon area and power, in addition to the actual operations that are specified by the program. This approach therefore reduces power efficiency even further as compared to ASICs.

In contrast, Stella mimics the approach of an ASIC and reduces power consumption by implementing customized, software-defined structures having customized, software-defined lifetimes so that the instructions are accessed less frequently. The number of operations per instruction is thereby increased, while the number of instructions accessed per cycle is decreased. In embodiments, this reduction in the rate of instruction accessing is roughly proportional to the ratio of the execution time to the program length, which can be billions divided by tens of thousands or about a factor of 100,000.

Stella's unique ISA design and control network thereby allows far more user-defined operations to be packed into a single instruction, and also significantly reduces the amount of memory that is required to store instructions and controls. This reduction of memory requirements can be used to decrease power consumption and/or to increase performance.

In addition, the disclosed Stella SoC design utilizes a Network-on-chip (NoC) to achieve much more efficient data transfer to feed the operations, thereby solving the second issue of how to provide the required data to the executing operations.

As noted above, another major source of power consumption for an SoC is the power required for data transfer. The data transfer power requirements of ASICs are significantly reduced due to the fact that each ASIC is only required to meet the specific data transfer requirements of the target application.

Based on the computation and data flow requirements of the target application, ASICs typically utilize hardware resources to perform data transfers, as follows:

Within a pipeline stage, an ASIC uses direct wire to transfer data.
Between pipeline stages, an ASIC uses pipeline registers to pass data. The processing rate is therefore required to be constant between pipeline stages.
Between different blocks that have different processing rates, an ASIC uses memory blocks for transfer buffering to compensate for the processing rate differences.

Figure 3:
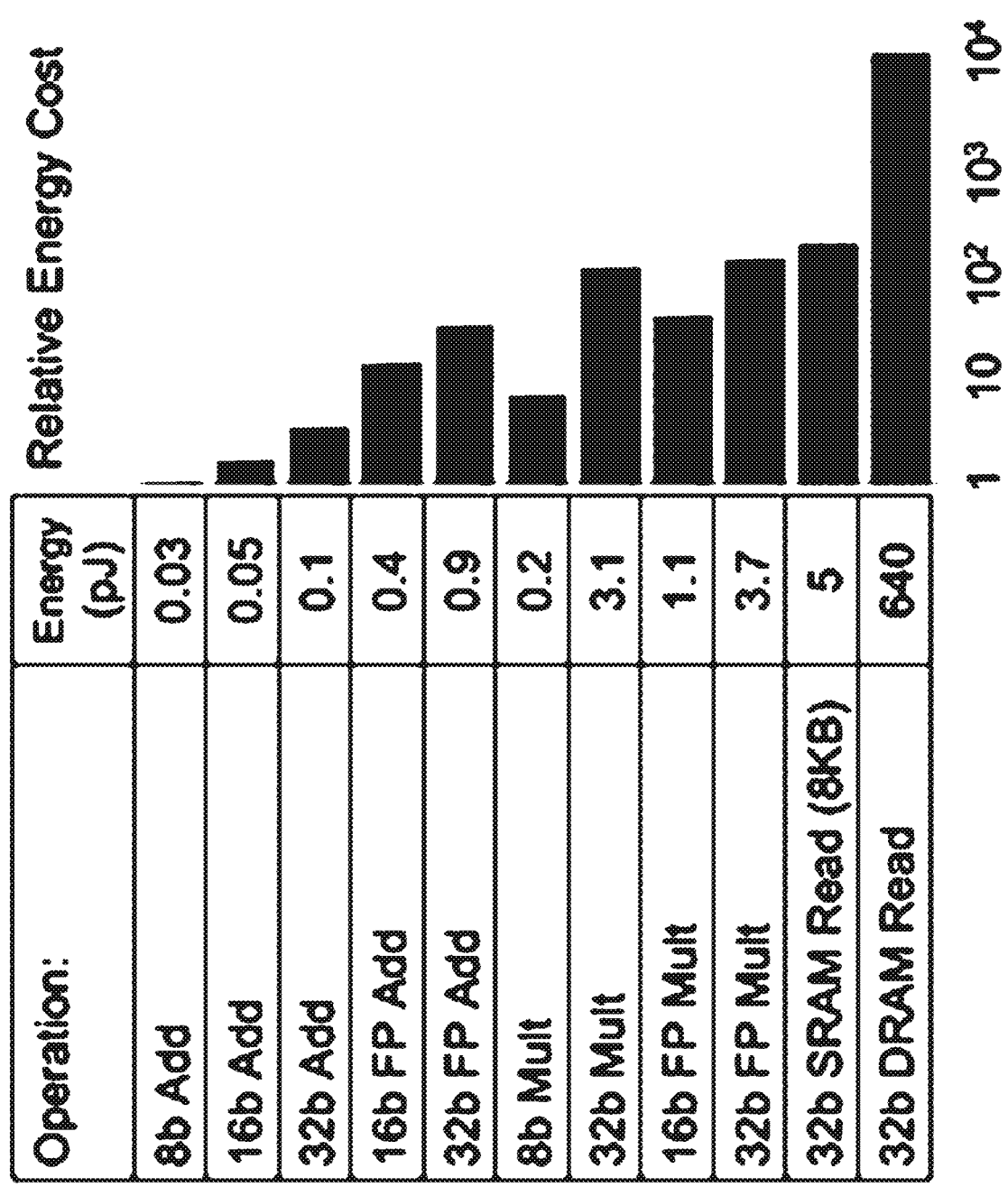
FIG. 3 is a chart indicating relative energy consumption of a process for different operations according to the prior art.

In a well-designed ASIC the first two methods of data transfer are used whenever possible, while the third method (buffering using memory blocks) is only used when absolutely necessary. This approach significantly reduces the data transfer energy requirement of ASICs. As shown in FIG. 3, data transfer through local wire and register files consumes less energy than data transfer through large memory. Power consumption is therefore also reduced. However, the data transfer mechanisms are fixed for a given ASIC, and are not programmable or configurable.

Furthermore, in some applications, such as Deep Learning, the data transfer power requirements are a significantly part of the overall power consumption even in SoCs that specifically target such applications. This is due to the fact that there are large amounts and different types of data reuse that take place in deep learning algorithms, where different algorithms focus on different types of data reuse. Any given SoC is typically designed with a focus on only one type of data reuse (e.g. weight reuse), such that when the focus of the algorithms changes to another type of data reuse (e.g. input reuse), the SoC is no longer efficient.

Stella solves this dilemma be enabling programmable control and reconfiguration of the data flow hardware, so that the Stella SoC is able to adapt to the different types of data reuse as needed.

In a single-core microprocessor, a shared memory data transfer model is used for data transfer. Correspondingly, the compiler for a single-core microprocessor is developed based on the shared memory data transfer model, and the instruction sequence produced by the compiler determines the order of each instruction's execution in time. The dependency between different instructions' operands and results are guaranteed by this sequence. Once a compiler is written, it can be reused for many generations of single-core microprocessors, where each generation only increases the clock frequency.

Figure 1:
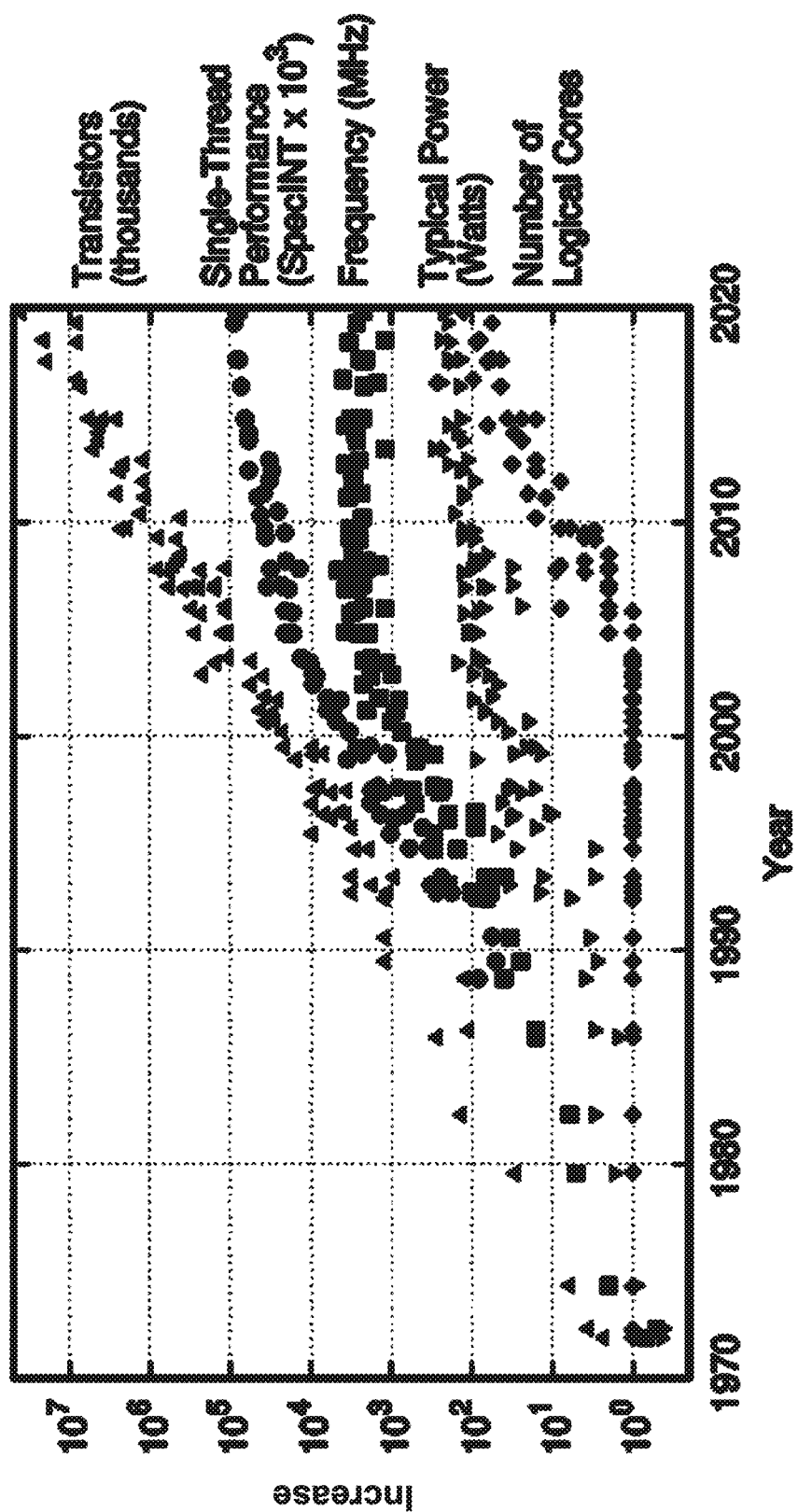
FIG. 1 is a graph that compares changes over time in hardware resources. operating performance, and energy consumption of high-end microprocessors from 1970 to the present, according to the prior art.
Figure 2:
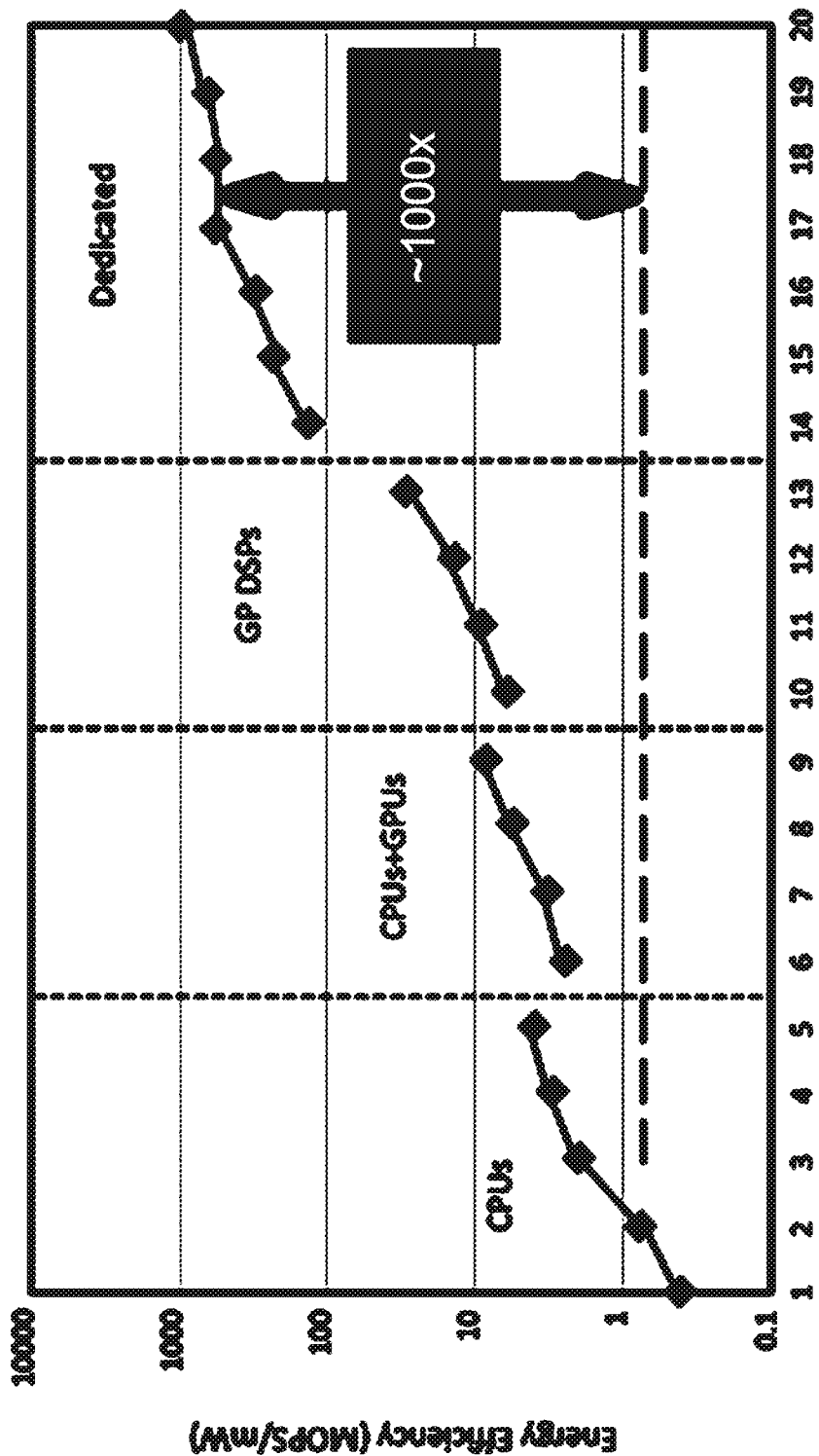
FIG. 2 is a graph that compares energy efficiencies for different categories of processors according to the prior art.

When power limitations began to make it increasingly difficult to increase clock speeds at the same rate as the number of transistors on a chip, designers turned to increasing the number of cores, as indicated in FIG. 1, so that in modern, multi-core SoC designs a separate thread can be executed on each of the cores. If there are data dependency between the executing threads, data transfers between different cores can be provided by either by centralized memory-based data transfer or by distributed memory-based data transfer.

Figure 14:
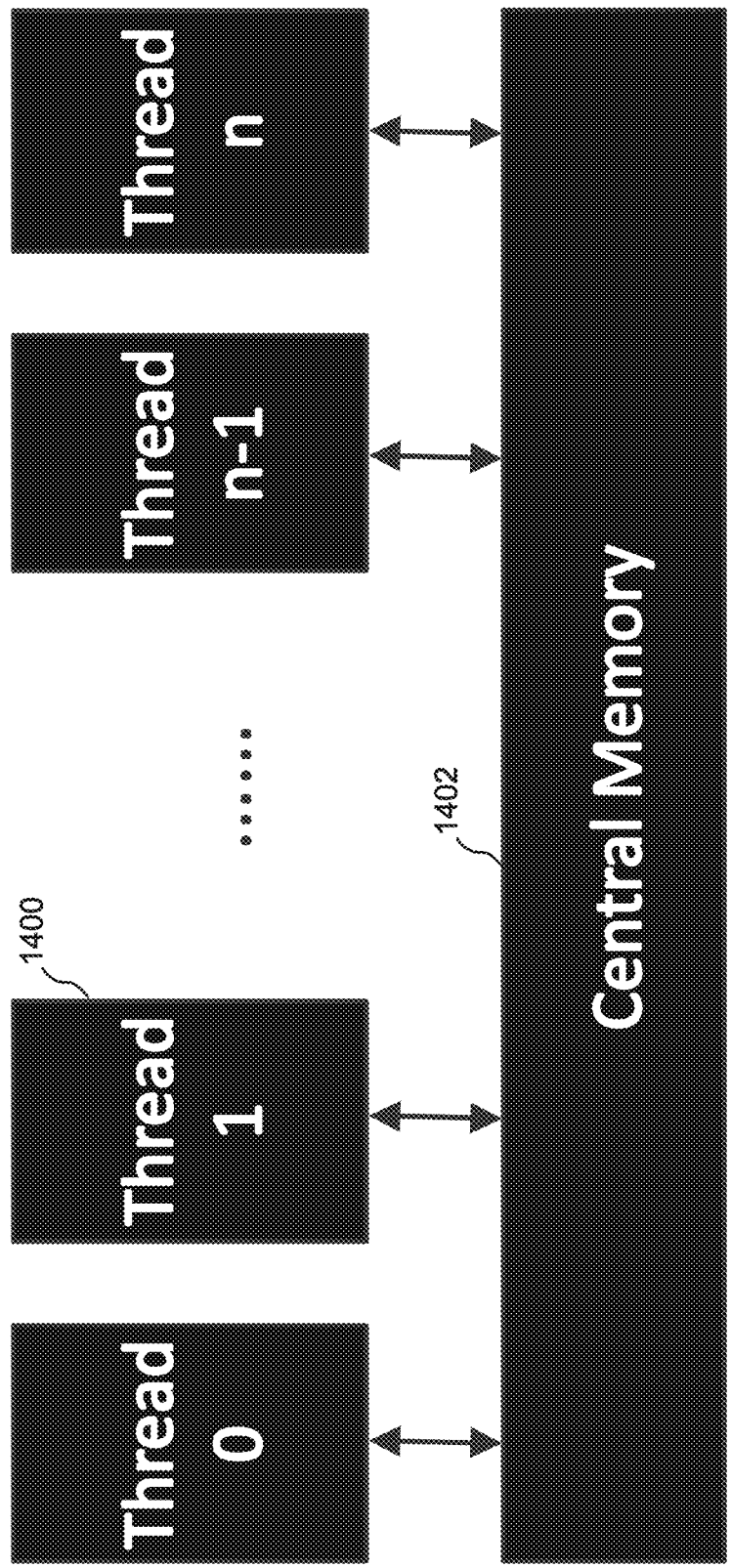
FIG. 14 illustrates a centralized memory-based data transfer according to the prior art.

Centralized memory-based data transfer, as illustrated in FIG. 14, follows the old implicit data transfer model in single-core microprocessors. However, when there are data transfers between different threads 1400 running on difference cores, synchronization is required to ensure that the data dependency as specified by the software is observed. For example, if op1 in core1 uses results of op0 in core0, the read operation by core1 has to occur after the write operation of core0. This is called "read after write". There are a few sets of such synchronization mechanisms in general applications.

When the number of cores rises to hundreds and thousands, this synchronization between the cores becomes a highly complex issue. In particular, the wait times for synchronization blocks become exceedingly long, and the centralized memory 1402 becomes very large, resulting in large data transfer energy requirements.

Another problem associated with data transfer through centralized memory 1402 in these traditional systems is the transfer efficiency. This is because a bus is typically used to access the centralized memory 1402, which leads to long wait times and ineffective data access. When the number of clients (cores) becomes large, a time slot with a fixed time overhead is allotted to each of the clients for transferring data. To compensate for the time overhead, the minimum time slot is just long enough to transfer a single line of data. Accordingly, if the size of a data transfer is smaller than a line, there is loss of transfer efficiency. Furthermore, due to the minimum time slot, each of the cores is required to wait for its turn to access data stored in the central memory, resulting in long delays in memory access by the threads 1400.

Figure 15A:
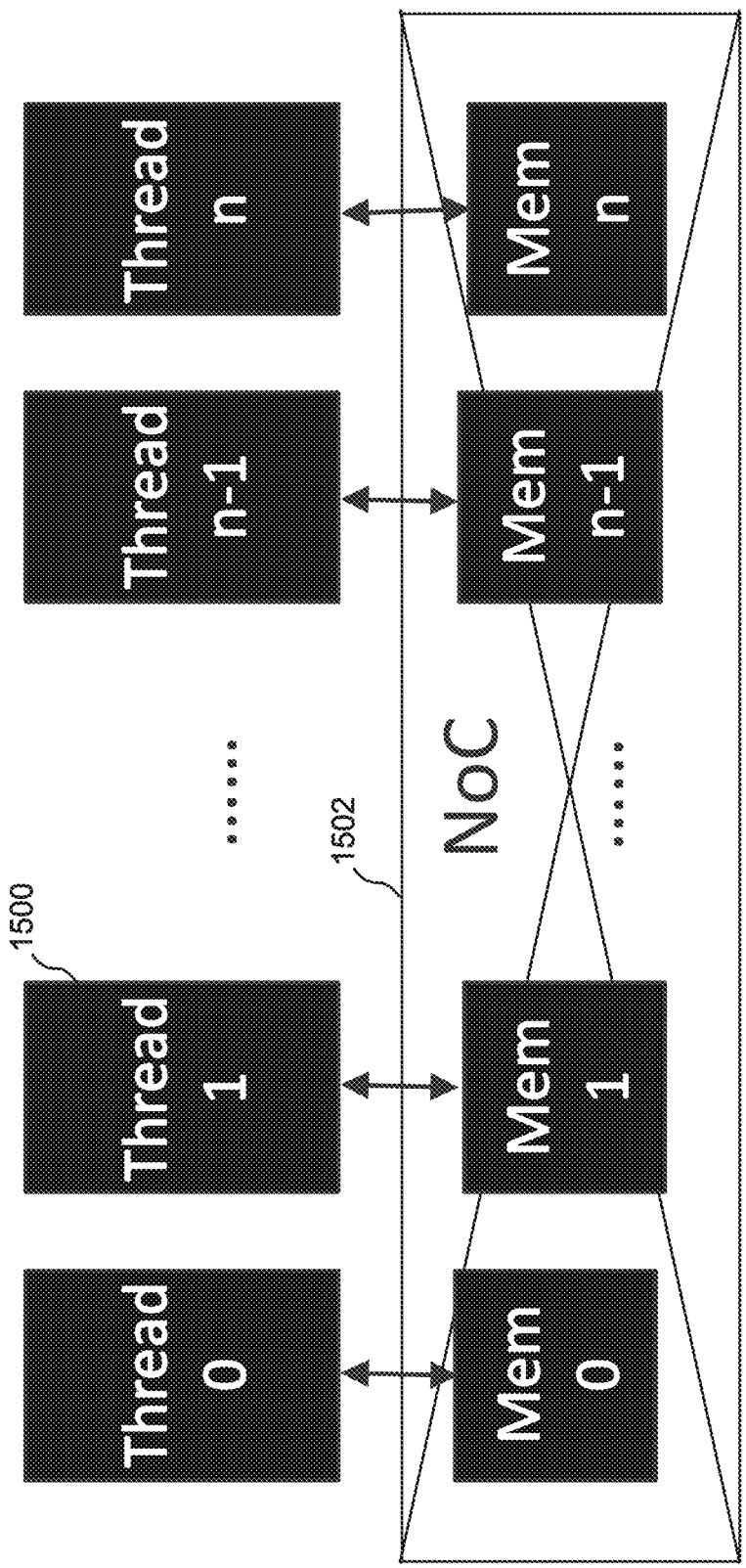
FIG. 15A illustrates distributed memory data transfer according to the prior art.

Distributed memory data transfer, as illustrated in FIG. 15A, follows an explicit data transfer model using a Network-on-Chip (NoC) 1502. Synchronization between difference threads 1500 according to this approach requires less wait time because each of the distributed memory blocks can have its own synchronization block. As the number of cores grows, the mapping of the data dependencies to the synchronization will depend on the NoC design. The key is to divide the software into threads and assign them to resources such that local threads execute more data transfers than remote threads. This is because remote transfers require more energy and consume more silicon area than local transfers. Distributed memory-based data transfer requires less energy than centralized memory-based transfer due to the smaller memory size, but still requires more energy than ASIC-like memory transfers.

In contrast, Stella uses hierarchical switches instead of buses to connect appropriate compute and data flow hardware blocks to form structures. Structures can be formed to allow the following types of operations:
  Weight stationary: takes advantage of weight reuse;
  Input stationary: takes advantage of input reuse;
  Row stationary: takes advantage of input row reuse; and
  Output stationary: reduce the amount of partial sum addition.

The present disclosure further includes a Stella compiler that is configured to optimize the performance of the Stella SoC.

Traditional superscalar microprocessor compilers focus on branch-predication and cache coherency protocols to issue more instructions per cycle, but rely on the operating system to assist in supporting multiple threads. It is very rare for a conventional compiler module to support the efficiency improvements offered by an NoC beyond ensuring that the data transfer does not exceed its capacity. However, recently in the Deep Learning field, discussion has been focused on using explicit methods to perform decoupled data transfers.

Figure 15B:
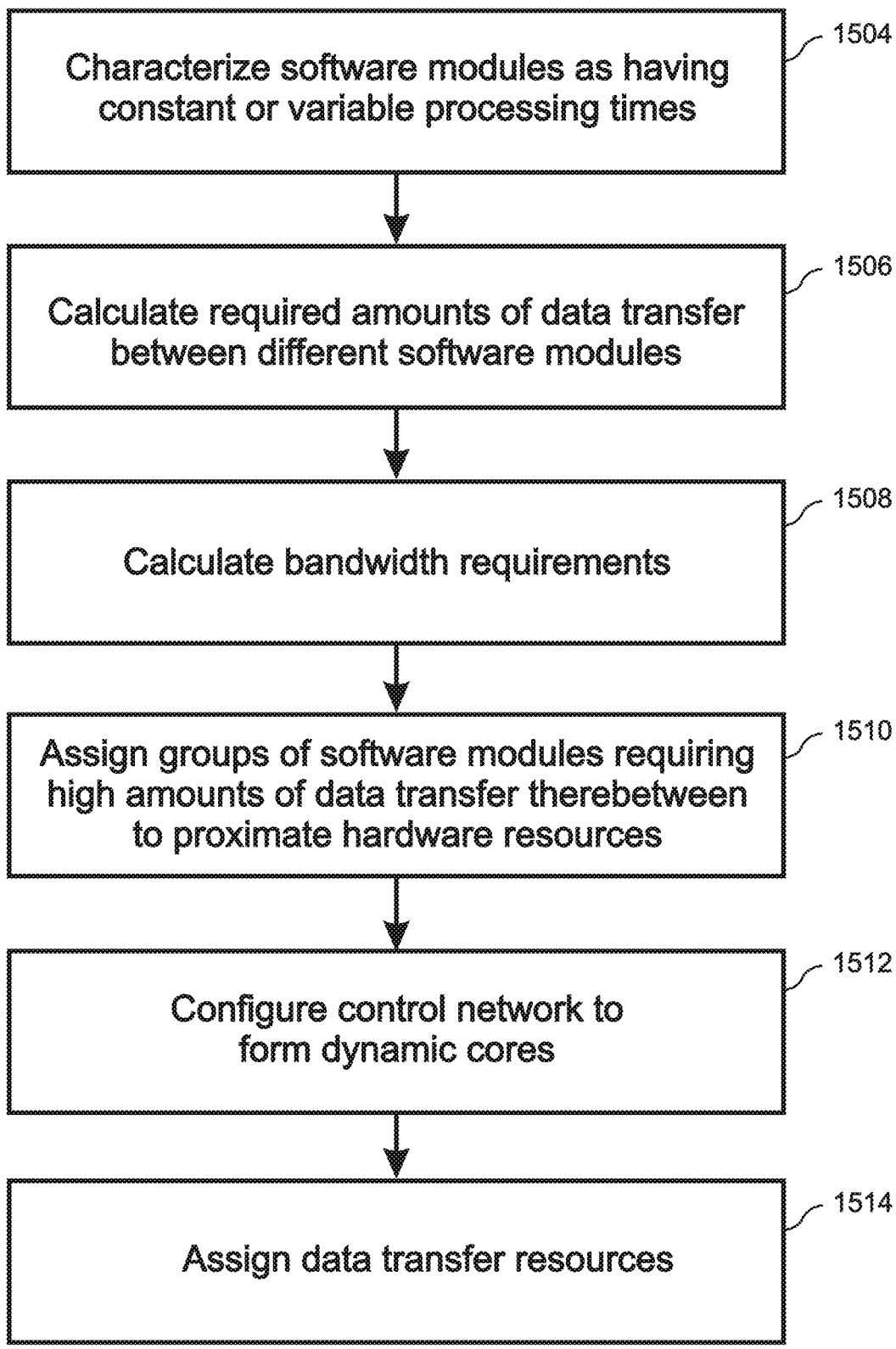
FIG. 15B is a flow diagram that illustrates the implementation of several different methods to reduce data transfer energy in an embodiment of the disclosed NoC.

In contrast, the Stella compiler of the present invention implements algorithms that assist the Network-on-Chip hardware to perform part of its work. In particular, with reference to FIG. 15B, the Stella compiler implements several different methods to reduce data transfer energy in the NoC:

The Stella compiler analyzes the software 1504 to determine whether software modules have constant processing times or variable processing times. The Stella then equalizes the processing times of selected groups of constant processing time modules by adding null-operations to the modules that have shorter processing times. The processing times of modules having variable processing times, in that their processing times are dependent on input values, cannot be equalized with other modules.

The Stella compiler then calculates 1506 the data transfer amount that will be required between different software modules. Based on timing performance requirements, bandwidth requirements are then calculated 1508.

Based on these calculations, the Stella compiler then assigns software modules requiring more data transfers to hardware resources that are closer together, while assigning software modules that require fewer data transfers to hardware resources that are more widely separated 1510.

The Stella compiler then configures the control network (CN) to form dynamic cores (DCs) 1512 according to the following principles:
  All hardware resources that are assigned to software modules having constant, equal processing times, or processing times that can be equalized by adding only a small number of null-operations, are incorporated into a single dynamic core (DC).
  Hardware resource groups that are assigned to software modules having widely different processing times are assigned to different DCs.
  The forming of DCs is subject to CN resources.

Next, the Stella compiler assigns data transfer resources 1514 according to the following principles:
  Within a single Dynamic Core, registers are used to perform data transfers between pipeline stages whenever possible.
  Within a single Dynamic Core, distributed memory is used to perform data transfers in a tightly coupled mode if no register is available.
  Across different Dynamic Cores, distributed memory is used to perform data transfers in a loosely coupled mode.
  Between Dynamic Cores and outside peripherals, centralized memory is used to perform data transfers in a loosely coupled mode.
  Data transfer resources are assigned subject to the bandwidth capacity of Network-on-Chip.

The Stella NoC hardware design comprises two different networks and associated memory systems:
  A distributed switching network referred to herein as the Hierarchical
  Programmable Network (HPS). The HPS is connected to distributed memories having small sizes. In embodiments, each of these memory elements can be part of a Dynamic Core. The HPS provides the data transfer mechanism used both within a single Dynamic Core and between different Dynamic Cores. It has simple synchronization mechanism that supports most common protocols.
  A centralized switching network, referred to herein as the Transport Switch (TS). The TS is connected to the centralized memory that is shared between all the DCs and external peripherals. The centralized memory size is larger than the distributed memories. The TS has a unique design that solves the data transfer efficiency problem in traditional multi-core microprocessors. It shares the same synchronization mechanism as us used by the HPS.

The Stella compiler selects either distributed or centralized data transfer resources to perform explicit data transfer functions with the goal of maximizing power efficiency. If needed, the cache coherent system that is implemented in traditional microprocessors can be emulated by software, but with a loss of efficiency.

Through programming the Network-on-Chip, a wide variety of applications can be implemented on Stella with data transfer energies that are close to the data transfer energies used by ASICs.

Figure 16:
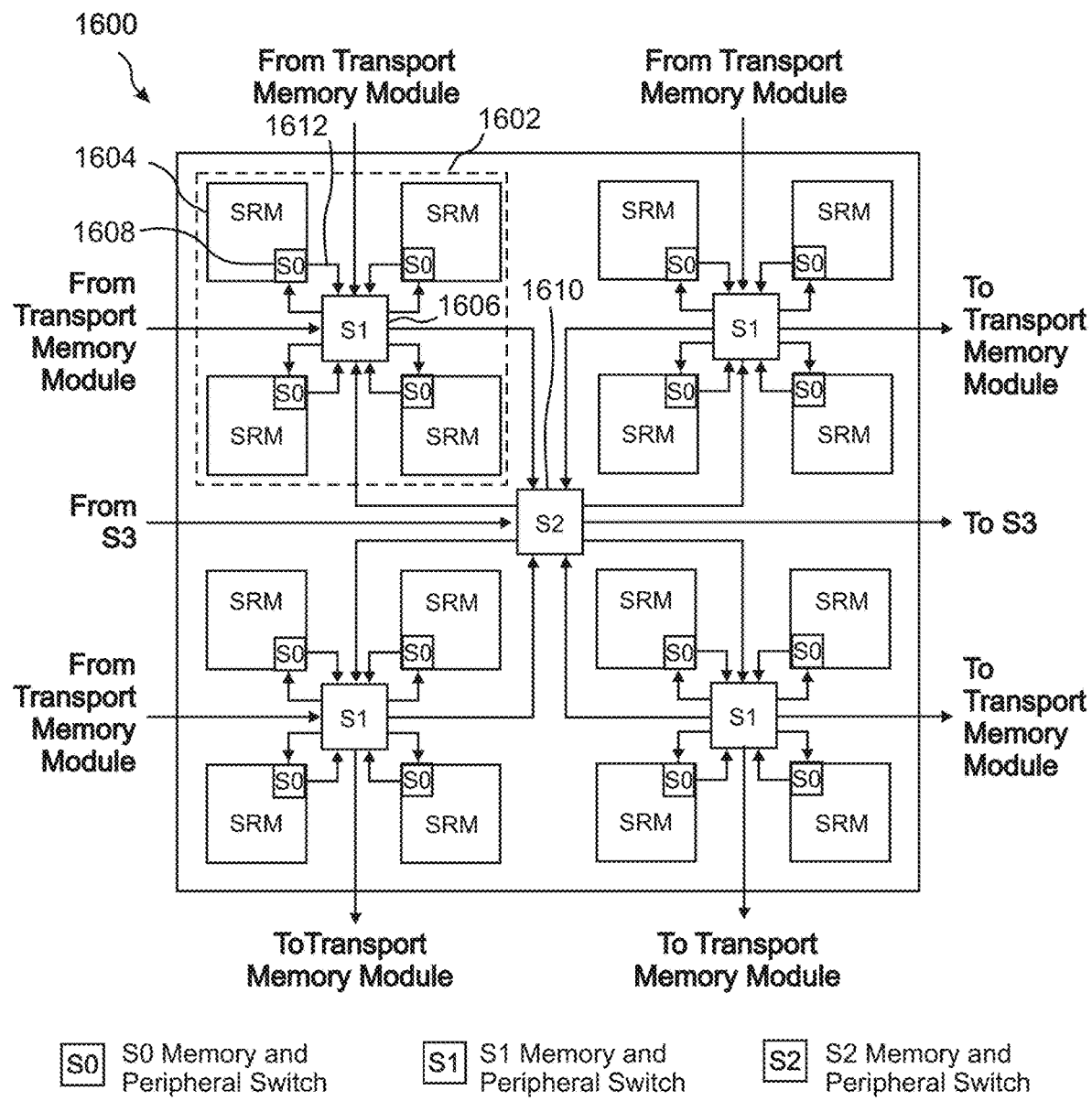
FIG. 16 illustrates the structure of a hierarchical programmable switch having a tree-like architecture of "leaf elements," each of which includes a plurality of SRMs interconnected by data, status and control channels to a switch node.

With reference to FIG. 16, the Stella HPS 1600 has a tree-like architecture of "leaf elements" 1602, each of which includes a plurality of SRMs 1604 interconnected by data, status and control channels 1612 to a switch node 1606. Each of the SRMs 1604 includes an internal switch 1608.

The HPS 1600 is shared between three different networks:
- a Data Network forming connections between data paths of the PEs to pass data;
- a Status Network forming connections between the PEs or between the sequencers to pass information pertaining to the status of data; and
- a Control Network forming connections between the sequencers and the PEs to pass control information and status information pertaining to control.

Going up the hierarchy, the leaf elements 1602 are organized into groups of four-leaf elements 1602 that all connect with a parent node 1610 having a fixed number of bi-directional channels. In the specific example of FIG. 16 illustrating an HPS design that includes 16-SRMs 1604, there are sixteen switch elements 1608 at level 0, four switch elements 1606 at level 1 and one switch elements 1610 at level 2, for a total of 21 switch elements. This structure grows linearly as the number of SRMs 1604 grow. For example, if an SoC contains 1024 SRMs 1604, its data and status network will include a total of 1365 switch elements organized in 6 hierarchical levels, as compared to the three levels of FIG. 16.

For the data and status networks, each channel 1612 contains data and status links in the same path. There is a forward status link in the data direction and a backward status link in the opposite direction. The status links can work together with the associated data link to solve synchronization problems for many different data transfer mechanisms. Common data communications mechanisms such as FIFO, circular buffer, and ping pong buffer have all been implemented in this way.

Each of the channels 1612 of the Data and Status networks is configurable to support data transfer in a circuit mode and in packet mode. Circuit mode data transfers have fixed time delays while utilizing channel resources in a time division multiplexed fashion between connections. The circuit mode support both tightly coupled and loosely coupled data transfers. Packet mode transfers have variable delays due to arbitration of the packets. Once the necessary resources are assigned, a single connection will occupy the resources of the channel 1612 full time. Packet mode only supports loosely coupled data transfers. Embodiments of the Stella HPS support unicast, multicast, and broadcast modes that are selectable through software programming.

As noted above, the Stella SoC of the present invention is configured to form Dynamic Cores (DCs). According to this approach, the same hardware block can belong to different DCs at different time periods during execution of a programming sequences.

Figure 17:
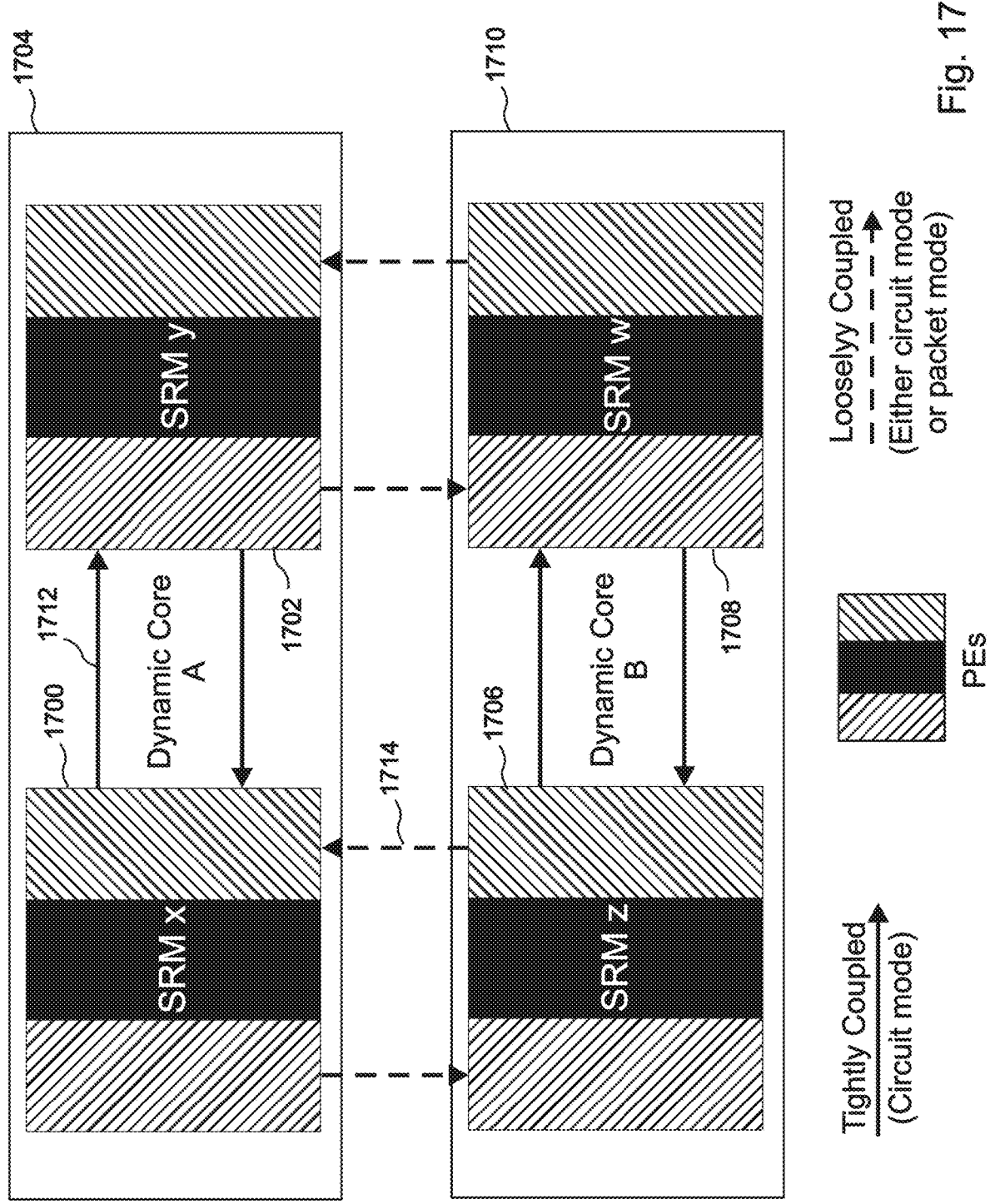
FIG. 17 illustrates the assignment of SRMs to dynamic cores in an embodiment of the present invention according to a first configuration.

For example, with reference to FIG. 17, during a first time period of a program sequence, a Stella SoC can be instructed to cause SRMs 412 x 1700 and y 1702 to belong to the same DC 1704, while SRMs 412 w 1708 and z 1706 share a different DC 1710. According to this configuration, tightly coupled data transfers 1712 will be used between the x SRM 1700 and the y SRM 1702, and also between the w SRM 1708 and the z SRM 1706. At the same time, loosely coupled data transfers 1714 will be used between the x SRM 1700 and the z SRM 1706, and also between the y SRM 1702 and the w SRM 1708.

Figure 18:
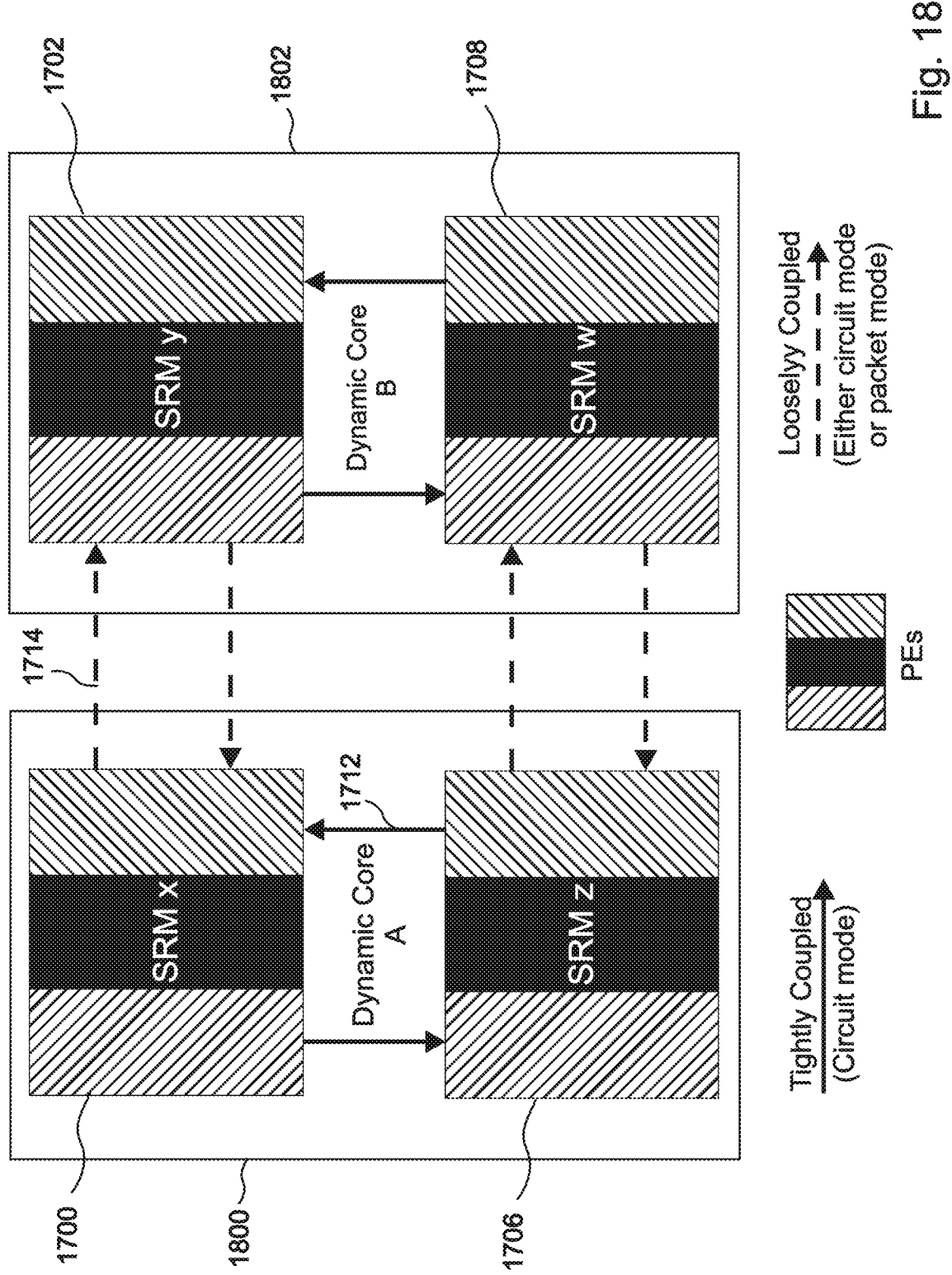
FIG. 18 illustrates the assignment of SRMs to dynamic cores in the embodiment of FIG. 17 according to a second configuration.

With reference to FIG. 18, during a second time period of the program sequence the Stella SoC can be instructed to cause the x SRM 1700 and the z SRM 1706 to belong to the same DC 1800, while the y SRM 1702 and the w SRM 1708 share a different DC 1802. According to this configuration, tightly coupled data transfers 1712 will be used between the x SRM 1700 and the z SRM 1706, and also between the y SRM 1702 and the w SRM 1708. At the same time, loosely coupled data transfers 1714 will be used between the x SRM 1700 and the z SRM 1702, and also between the y SRM 1706 and the w SRM 1708.

In the Stella HPS 1600, the connections 1712, 1714 for data transfer are formed by channels in the HPS switch 1600, each of which is configurable between circuit mode and packet mode, thereby supporting both tightly coupled 1712 and loosely couple 1714 data transfer. These connections can be established at different times to serve different hardware configurations as needed during program execution.

For circuit mode data transfer within a single DC, the Stella compiler will pre-compute the connections that are necessary and will generate the control program for the HPS 1600. The Stella compiler will also decide when to use registers and when to use distributed memory for data transfers according to resource availability and energy requirements. Synchronization between different hardware blocks is only needed when a DC is formed. This type of data transfer requires the least amount of synchronization and arbitration resources. If necessary, circuit mode can also be used to emulate packet mode without arbitration to serve the loosely coupled data transfer requirements.

Synchronization and arbitration are needed for every packet transfer. The Stella hardware architecture includes an arbitration system that is used to form connections for packet mode data transfer, rather than requiring the HPS control program to provide arbitration. The basic synchronization protocol is built into the arbitration logic, which responds to the signals on the status link. However, this arbitration of a connection still consumes hardware resources and cycles during execution. This synchronization logic resource usage is minimized by providing the status links in parallel with the data links in a manner that is similar to the implementation of arbitration in ASICs.

Figure 19:
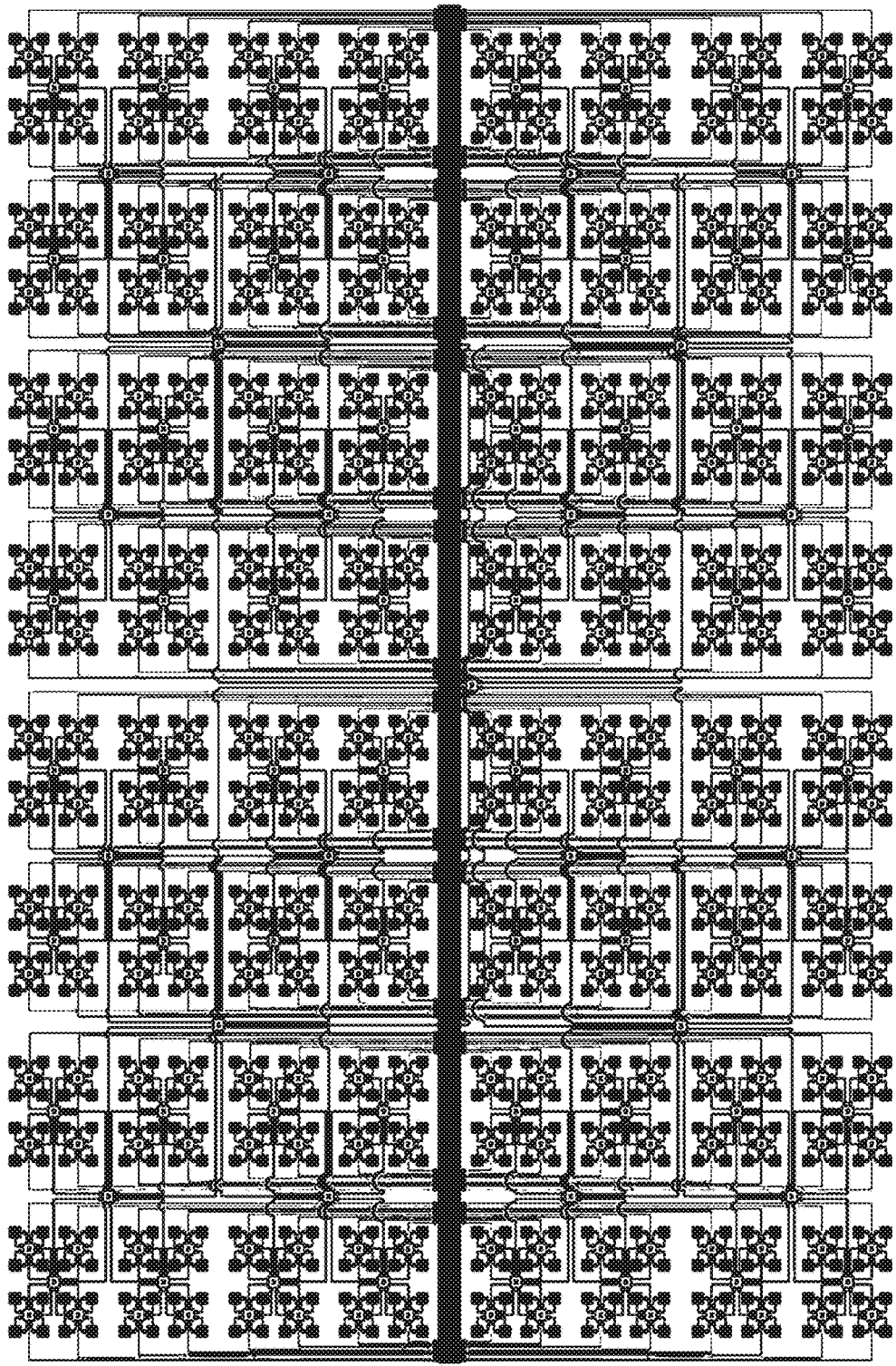
FIG. 19 illustrates a 1024 SRM design which includes a transport switch that incorporates centralized memory according to an embodiment of the present invention.

With reference to FIG. 19, the Stella transport switch (TS) 1900 also provides connections by means of shared memory between the SRMs 412 and external peripherals such as DDRs, PCI-e, and host port interfaces. The Stella TS design thereby reduces centralized memory access latency and increases efficiency as compared with traditional bus-based memory access in traditional multi-core processors.

FIG. 19. The Stella transport switch 1900 enables highly efficient data transfer between SRMs 412 and external peripherals through the centralized memory of the TS 1900. The centralized memory of the TS 1900 can also serve as a buffer to store data for usage by the SRMs 412 over time. In this case, the TS 1900 will enable data transfer between its centralized memory and the SRMs 412. When no more space remains in the distributed memory, or there is no more capacity left in the HPS 1600, the TS 1900 can also provide data transfer between the SRMs 412, but with greater energy consumption. The Stella compiler is responsible for selecting the data transport mechanisms that will minimize energy consumption.

The Stella Transport Switch 1900 connects with the SRMs 412 and peripherals through the same interface that also forms connections between the SRMs 412 and the HPS 1600. The TS 1900 also shares the same synchronization mechanism with the SRMs 412 and HPS 1600.

Figure 20:
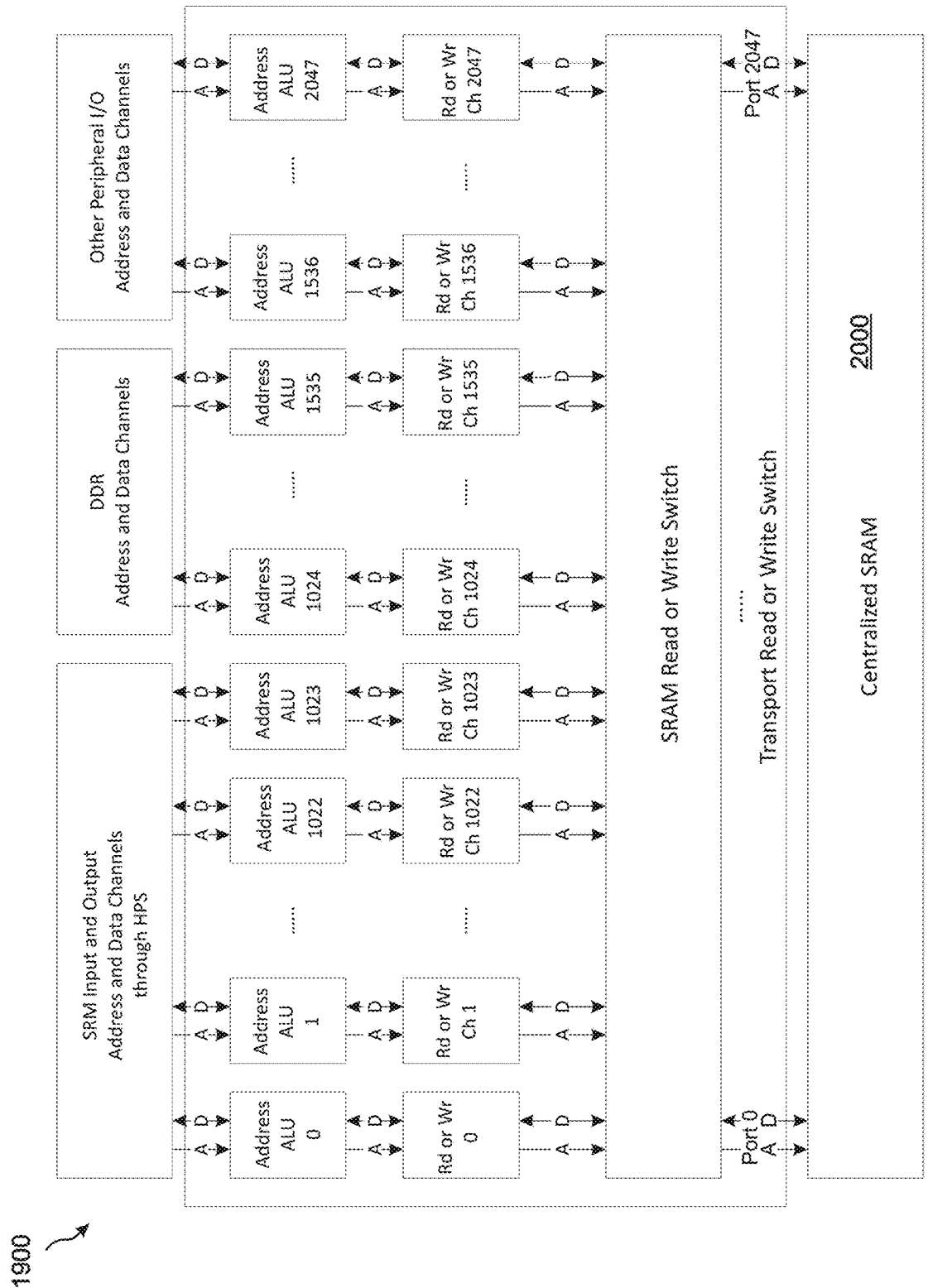
FIG. 20 illustrates a transport switch that is used in place of a bus to allow different clients to access different banks of a centralized memory during the same cycle.

As is illustrated in FIG. 20, the Stella SoC uses the Transport Switch 1900 instead of a bus to allow different clients (SRMs 412 and/or peripherals) to access different banks of the centralized memory 2000 in the same cycle. Correspondingly, a Transport Module in the Stella Compiler is used to generate memory access patterns that will allow different clients to access different 2D memory areas, and to allow different clients to accessing the same 2D memory area at different cycles within the same time period. This approach significantly reduces access latency and increases effective data transfers.

In embodiments, the Stella complier uses a special Deep Learning module (DLM) that accepts input programs written in Tensor Flow and generates assembly code to be executed on the Stella SoC.

The Stella DLM accepts Tensor Flow program graphs and analyzes the network to make optimal choices for lowest data transfer power from among the options described above for each network layer. These decisions are made based on the tensor size of the input, as well as output, weight and Stella SoC internal memory, and also on the combining of layers to reduce data transfer. The Stella DLM can generate assembly code for any number of SRMs 412 with significantly reduced data transfer power requirements The Stella complier uses software algorithms and/or tools to assist the hardware in selecting data transfer mechanisms that minimize energy use and in generating programs for use by the hardware to perform transfers. In particular:
  the Stella compiler and/or tools select HPS and distributed memory for data transfers between SRMs 412 whenever the required bandwidth is available, thereby reducing energy consumption.
  the Stella compiler and/or tools select TS and centralized memory for data transfers between SRMs 412 if sufficient distributed memory or HPS bandwidth is not available, or if the data transfer involves off-chip peripherals.

Stella uses its compiler and/or tools to analyze each software application to:
  determine which of the software modules will have a constant processing rate and which of the software modules will have a processing rate that is data-dependent, and then to calculate whether the processing rates between various module threads are equal or different;
  assign modules requiring more data transfer to local SRMs 412, while assigning modules requiring less data transfer to remote SRMs 412; and
  use the HPS and TS to enable tightly coupled data transfers between modules having constant processing rates and loosely coupled data transfers between modules having different processing rates, both for modules that are executing on the same SRM 412 and for modules that are executing on different SRMs 412, by generating appropriate HPS and TS programs.

| ASIC Data Transfer & Synchronization Mechanism | Stella Data Transfer & Synchronization Mechanism |
| --- | --- |
| Use transfer over wires or pipeline registers for local data transfers when processing rates are constant. | Use transfer over registers for local data transfers when resources are available. |
| Use memory buffering for local data transfer when processing rates are different between threads. | Use distributed memory with small size for local data transfer when Processing rates are constant between threads, but no register is available. Processing rate are different between threads. |
| Use memory buffering for remote data transfer when processing rates are different between threads. | Use distributed memory with small size for remote data transfers between threads whether their processing rates are constant or different. |
| Use centralized memory of adequate size for target application off-chip data transfer. | Use centralized memory with adequate size for multiple target applications for off-chip data transfers. |
| Use simple, application specific synchronization to reduce hardware and energy costs. | Mimic ASIC designs for synchronization to minimize hardware resource usage. |

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A system on a chip (SoC), referred to herein as the Stella SoC, comprising:
  a plurality of programmable elements (PEs);
  an index;
  a plurality of sequencers;
  at least one switch; and
  a control network (CN) configured to transfer a control vector index from the sequencers to the PEs during program execution;
  the index being configured to point to a storage location that stores a plurality of structure configuration instructions defining structures that can be successively implemented during program execution under program control, each of said structures, when implemented, causing the at least one switch to create an Index Specified Architecture (ISA) by forming connections between the PEs to create dynamic cores (DCs) having specified configurations, said ISA further defining mechanisms by which data is transferred between the PEs during program execution.

2. The SoC of claim 1, wherein at least one of the PEs is a compute block, at least one of the PEs is a storage block, and at least one of the PEs is a switch block.

3. The SoC of claim 1, wherein each of the DCs comprises one of the sequencers interconnected by the at least one switch with at least one of the PEs.

4. The SoC of claim 1, wherein the at least one switch comprises a plurality of switches, and wherein a first one of the plurality of switches is a Hierarchical Programmable Switch (HPS) and a second one of the plurality of switches is a transport switch (TS).

5. The SoC of claim 4, wherein the TS comprises centralized memory.

6. The SoC of claim 4, wherein the HPS is configured as a hierarchical plurality of layers, each of the hierarchical plurality of layers comprising at least one leaf element, each of said leaf elements comprising a plurality of the DCs interconnected with each other by a switch node of the HPS, the leaf elements in each layer of the hierarchical plurality of layers except an uppermost layer of the hierarchical plurality of layers comprising a plurality of leaf element groups, wherein all of the leaf element groups in all of the layers of the hierarchical plurality of layers except the uppermost layer of the hierarchical plurality of layers are interconnected with each other by a parent switch node of the HPS to form a single leaf element of a next-higher layer of the hierarchical plurality of layers.

7. The SoC of claim 1, wherein each of the connections formed by the at least one switch can be separately configured, under software control during program execution, to be either a circuit mode connection or a packet mode connection.

8. The SoC of claim 1, wherein the CN is further configured to transfer a status for next structure configuration instruction from the PEs to the sequencers during program execution.

9. The SoC of claim 1, wherein the SoC is able to cause different ones of the DCs to execute software instructions at different control frequencies.

10. A method of preparing software code that can be executed by the SoC of claim 1, the method comprising:
    accepting source code that defines operations to be carried out by the SoC, said source code comprising a plurality of software modules;
    calculating amounts of data transfer and data transfer bandwidths between the software modules that will be required during execution of the software code;
    assigning the software modules to selected PEs for execution thereupon, wherein groups of the software modules that will require a high data transfer bandwidth therebetween are assigned to physically proximate PEs; and
    preparing structure configuration instructions that can be stored in the index and retrieved during program execution to implement structures, each of said structures, when implemented, causing at least one switch to create dynamic cores (DCs) by interconnecting specified groups of the PEs and forming control networks that interconnect the sequencers with the PEs.

11. The method of claim 10, further comprising characterizing each of the software modules as having either a constant processing time or a variable processing time;
    forming at least one constant time module group, each of the constant time module groups including only software modules that have constant processing times that are the same as, or similar to, each other;
    for each of the constant time module groups, equalizing the constant processing times of the software modules in the constant time module group by adding null operations thereto as needed to cause the processing times of all of the software modules in the constant time module group to be equal to each other; and
    for each of the constant time module groups, assigning all of the software modules that are included in the constant time module group to the same dynamic core.

12. The method of claim 10, further comprising causing the at least one switch to create:
    a data network that forms connections between data paths of the PEs;
    a status network that forms connections between the PEs or between the sequencers; and
    a control network that forms connections between the sequencers and the PEs.

13. The method of claim 10, further comprising:
    for each of the dynamic cores, causing data transfers within the dynamic core to be made via at least one register of the dynamic core whenever possible;
    for each of the dynamic cores, causing data transfers within the dynamic core to be made via distributed memory in a tightly coupled mode if the data transfer cannot be made via the one or more registers of the dynamic core;
    causing data transfers to be made between the dynamic cores via distributed memory in a loosely coupled mode; and
    causing data transfers to be made between the dynamic cores and external peripherals via centralized memory in a loosely coupled mode.

14. The method of claim 10, further comprising causing the software modules that are being executed on different ones of the dynamic cores to be executed at different control frequencies.

15. A system on a chip (SoC), referred to herein as the Stella SoC, comprising:
    a plurality of programmable elements (PEs), said plurality of PEs comprising at least one compute block, at least one switch block and, at least one storage block;
    a plurality of sequencers;
    a network on a chip (NoC), the NoC being configured to create a plurality of Dynamic Cores (DCs) by interconnecting selected groups of one or more of the PEs with selected ones of the plurality of sequencers, each of the DCs thereby comprising one of the plurality of sequencers interconnected by a Control Network (CN) of the NoC with at least one of the PEs; and
    an index;
    the NoC comprising a Hierarchical Programmable Switch (HPS) and a transport switch (TS), the TS comprising centralized memory;
    the HPS being configured to form a hierarchical plurality of layers, each layer of the hierarchical plurality of layers comprising at least one leaf element, each of said leaf elements comprising a plurality of the DCs interconnected with each other by a switch node of the HPS, the leaf elements in each layer of the hierarchical plurality of layers except an uppermost layer of the hierarchical plurality of layers comprising a plurality of leaf element groups, wherein all of the plurality of leaf element groups in the layer each layer of the plurality of layers except the uppermost layer of the hierarchical plurality of layers are interconnected with each other by a parent switch node of the HPS to form a single leaf element of a next-higher layer of the hierarchical plurality of layers;

the index being configured to store a plurality of structure configurations that can be successively implemented during program execution, each of said plurality of structure configurations, when implemented, causing the NoC to create an Index Specified Architecture (ISA) by causing the NoC to generate a specified number of DCs having specified configurations, said ISA further comprising defined mechanisms by which data is transferred between the PEs during program execution.

* * * * *